United States Patent
Ishizu et al.

(10) Patent No.: US 7,629,927 B2
(45) Date of Patent: Dec. 8, 2009

(54) METHOD FOR FORMING A BEAM OF AN ARRAY ANTENNA AND APPARATUS THEREFOR

(75) Inventors: Eizou Ishizu, Yokohama (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 10/926,444

(22) Filed: Aug. 25, 2004

(65) Prior Publication Data

US 2005/0190105 A1 Sep. 1, 2005

(30) Foreign Application Priority Data

Mar. 1, 2004 (JP) .............................. 2004-056522

(51) Int. Cl.
G01S 3/16 (2006.01)
(52) U.S. Cl. ...................................... 342/383; 342/373
(58) Field of Classification Search ................ 342/368, 342/372, 373, 378, 383
See application file for complete search history.

(56) References Cited

U.S. PATENT DOCUMENTS

| 6,791,967 | B1 | 9/2004 | Ishida | |
|---|---|---|---|---|
| 2002/0191246 | A1* | 12/2002 | Hirabe | ........................ 359/111 |
| 2004/0033818 | A1 | 2/2004 | Nakamura | |

FOREIGN PATENT DOCUMENTS

| EP | 1 341 320 | 9/2003 |
|---|---|---|
| JP | 08-285934 | 11/1996 |
| JP | 2001-148655 | 5/2001 |
| JP | 2001-203630 | 7/2001 |
| JP | 2001-251233 | 9/2001 |
| JP | 2001-320318 | 11/2001 |
| JP | 2002-208889 | 7/2002 |
| JP | 2002-359588 | 12/2002 |
| JP | 2003-8494 | 1/2003 |
| JP | 20003-051775 | 2/2003 |
| JP | 2003-087189 | 3/2003 |
| JP | 2003-092548 | 3/2003 |
| JP | 2003-092549 | 3/2003 |
| WO | WO97/23017 | 6/1997 |
| WO | WO 00/11823 | 3/2000 |

OTHER PUBLICATIONS

Fumiyuki Adachi. Evolving Wireless Communications Technology. General Convention Conference Paper, Oct. 2002 Institute of Electronics, Information and Communication Engineers, Convention Committee's Special Plan.
European Search Report dated Dec. 20, 2007, from the corresponding European Application.
C. Sun, et al. "Duplicate Channel Allocation of Null-Forming Based SDMA in the Presence of Antenna Array Mutual Coupling" IEEE, vol. 2, Dec. 15, 2003, pp. 1096-1100.
Japanese Reason for Refusal dated Jul. 22, 2008, from the corresponding Japanese Application.

* cited by examiner

*Primary Examiner*—Dao L Phan
(74) *Attorney, Agent, or Firm*—Katten Muchin Rosenman LLP

(57) ABSTRACT

A method for forming a beam in an array antenna to orient a null point of the array antenna to a mobile station which acts as interference, includes the step of: forming a beam in such a manner that, based on a moving speed of the mobile station acting as interference, a moving direction and a distance between the array antenna and the mobile station, a signal power to interference power ratio may be equal, regardless of the distance, between before and after movement when the mobile station acting as interference moves.

30 Claims, 23 Drawing Sheets

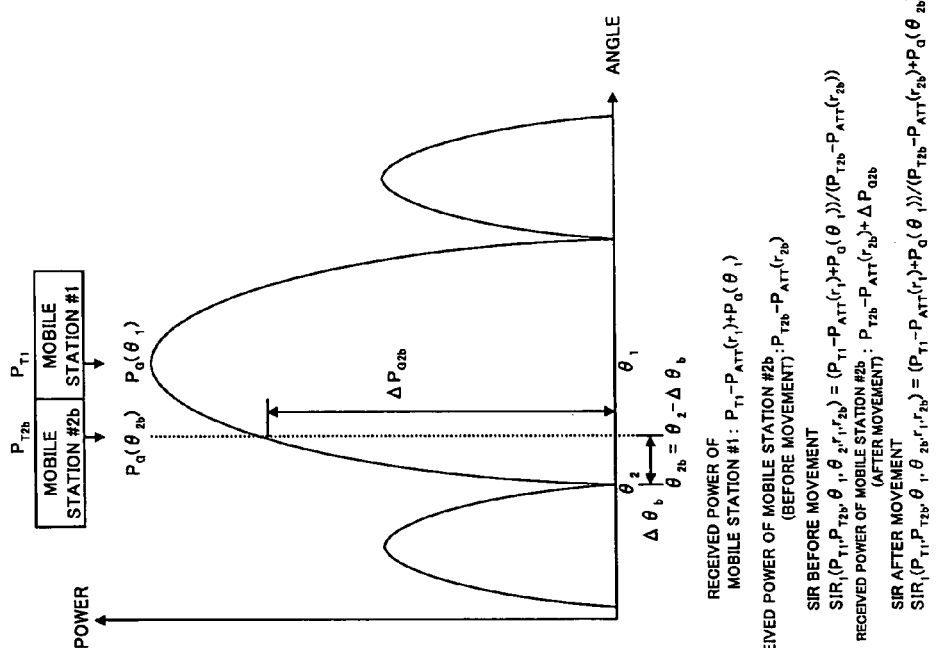
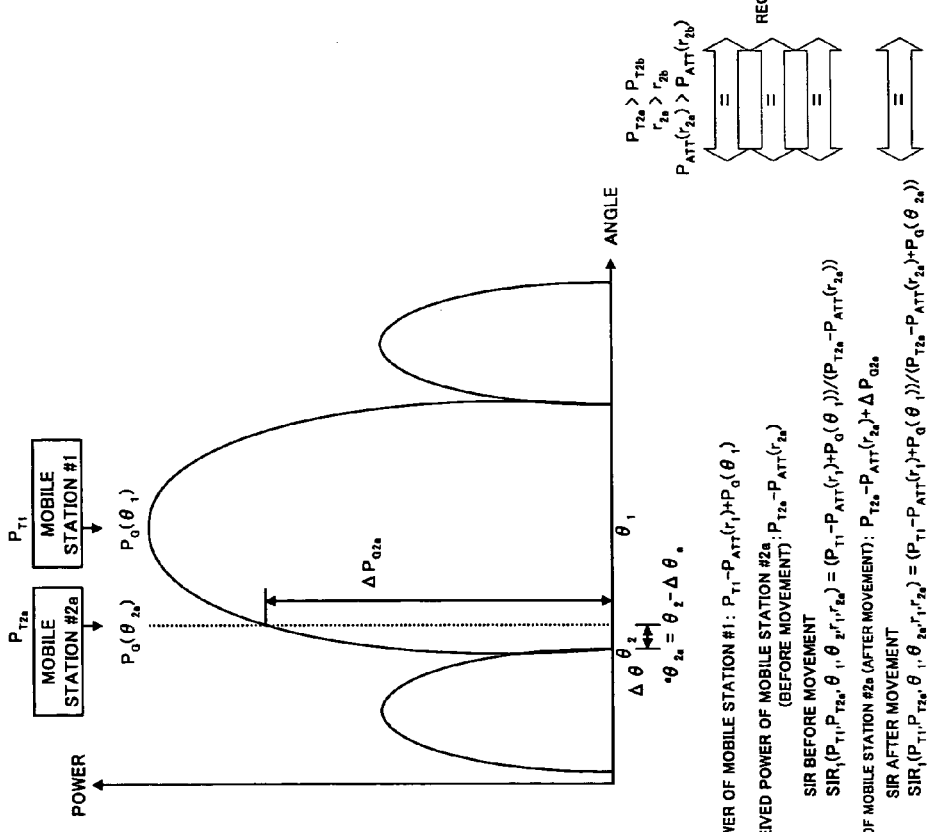

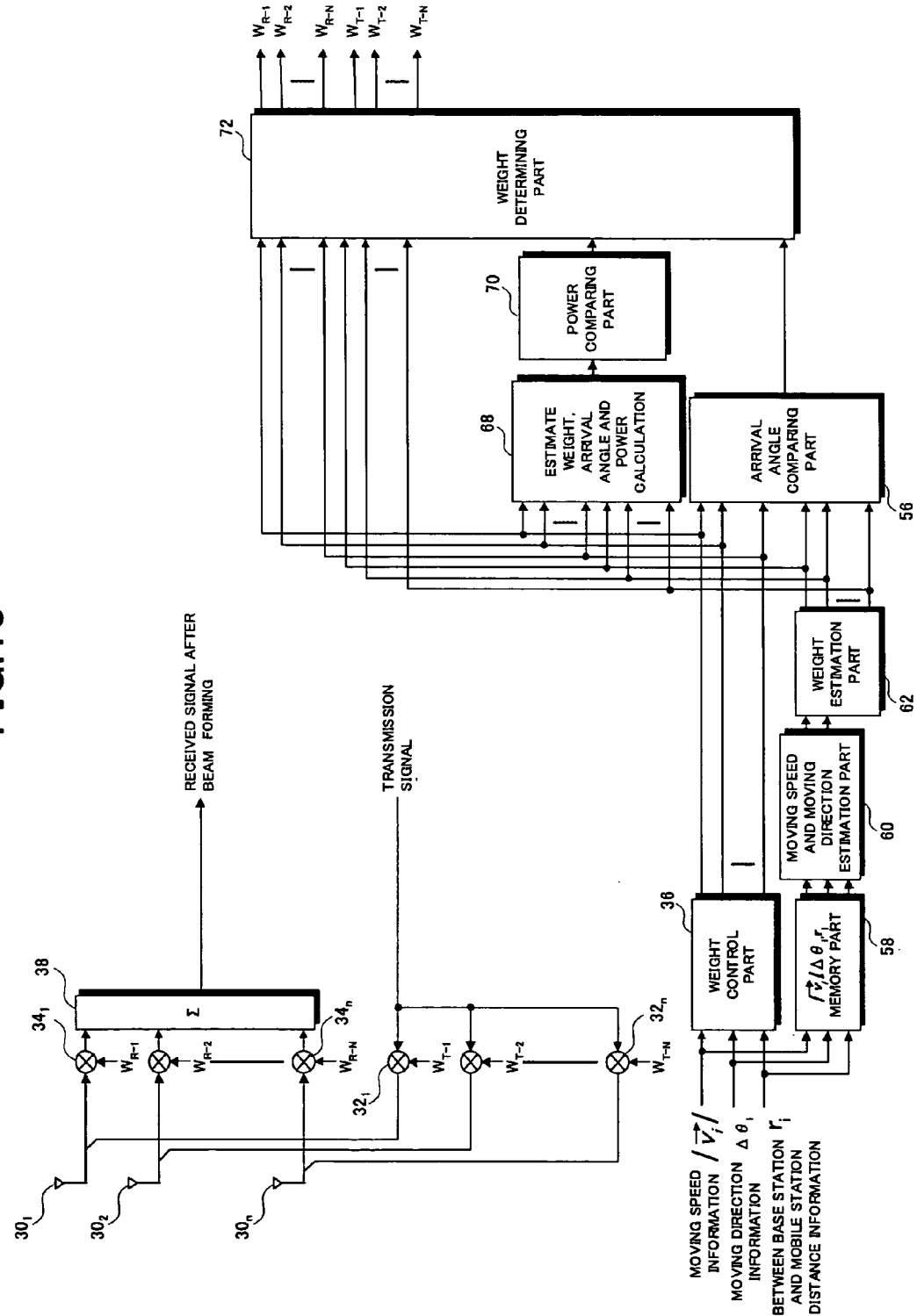

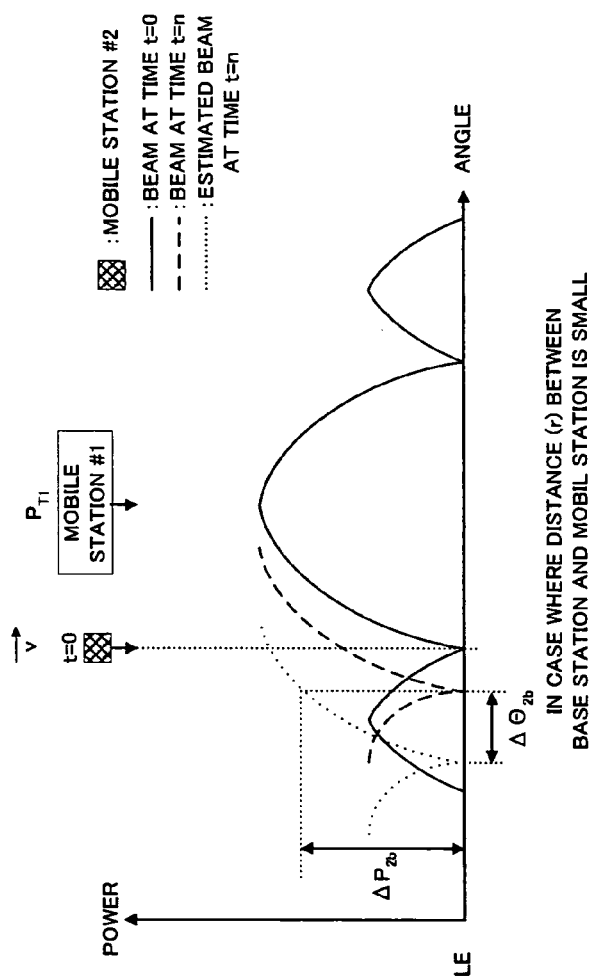
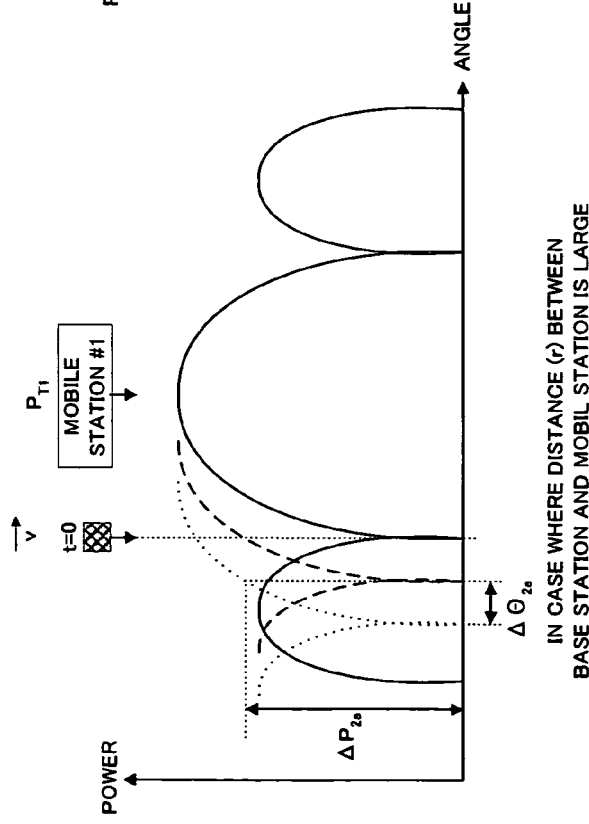

METHOD FOR FORMING A BEAM OF AN ARRAY ANTENNA AND APPARATUS THEREFOR

BACKGROUND OF THE INVENTION

1. Field of the Invention

The present invention relates to a method for forming a beam of an array antenna and an apparatus therefor, and, in particular, to a method for forming a beam of an array antenna with the use of a null forming method, and an apparatus therefor.

2. Description of the Related Art

In wide-band radio communication, decrease in a service radius along with increase in transmission band width due to a limitation to transmission power may be a problem. In particular, in a cellular system, a limitation is applied to transmission power from a mobile station on the order of hundreds of milliwatts utmost. Therefore, uplink/downlink asymmetrical communication is supported by a wide-band radio system on a third generation (3G) or a higher generation. By setting an uplink transmission band width toward a base station from a mobile station lower than downlink transmission band width from the base stain to the mobile station, peak transmission power in the mobile station may be reduced. However, since a transmission rate, i.e., a transmission band width increases tens through hundreds of times, it is difficult to keep a cell radius (service radius) as it is.

For example, according to 'Future Outlook of Mobile Communication', written by Fumiyuki Adachi, Spectrum Spread Society Conference Paper, October 2000, of Institute of Electronics, Information and Communication Engineers, upon comparison between 3G (transmission rate of 384 kbps in fc=2 GHz) and a public service in a next-generation mobile communication system for which study has been started recently, i.e., 4G (transmission rate of 100 Mbps in fc=5 GHz), power in approximately 2800 [=(2.5)$^{2.6}$×260] times will be required, according to a law of 'fc$^{2.6}$×Rate'. In other words, the transmission power increases by a degree equivalent to 35 dB.

Such a situation cannot be permitted in consideration of peak transmission power of a 3G terminal on the order of 0.2 W, since 560 W is required instead. In other words, assuming 50 Mbps, which is a half, to be provided for the uplink in the asymmetrical link system, improvement more than 30 dB is required. Further, by applying a 3.5-th power law to a propagation loss, a cell radius is reduced on the order of ⅛ through ⅒. Then, assuming that the cell radius in 3G is 5 km, a cell radius on the order of 500 m through 600 m is presumed. Since reduction in the cell radius increases the required number of base stations per unit area to the second power, improvement of power efficiency is indispensably demanded, i.e., it is necessary to increase in the cell radius on a condition of fixed peak transmission power, by increasing a gain of a directive antenna such as an adaptive array antenna, in order to achieve a seamless service in a wide-band radio system.

For the adaptive array antenna (AAA), there are two approaching methods, i.e., a 'beam steering method' of directing a directive beam to a communication target and increasing a signal (S) factor in a ratio [S/(I+N)] of the Desired signal (S), an interference signal (I) and a noise (N); and a 'null steering (null forming) method' of suppressing interference signals from other cells or other users, and thus suppressing the interference signal (I) factor in the ratio [S/(I+N)]. The present invention particularly relates to the latter method.

FIG. 1 shows a block diagram of an apparatus employing the null forming method according to the related art. With the use of N antennas, $10_1$ through $10_n$, a weight vector $W_T$ for transmission beam forming given to multipliers $12_1$ through $12_n$ is expressed as $|w_{T-1}, w_{T-2}, \ldots, w_{T-N}|$, and a weight vector $W_R$ for reception beam forming given to multipliers $14_1$ through $14_n$ is expressed by $|w_{R-1}, w_{R-2}, \ldots, w_{R-N}|$. An arrival direction estimation part 16 estimates a path arrival direction (DoA: Direction of Arrival), from a mobile station acting as interference. A convergence algorithm part 18 operates a convergence algorithm such as that of a steepest descent method (LMS: Least Mean Squire) based on the path arrival direction DoA, and carries out reception null forming. Thereby, the weight vector $W_T$ for transmission beam forming and the weight vector $W_R$ for reception beam forming are generated. Output signals of the multipliers $14_1$ through $14_n$ are added together by an adding part 20 and the addition result is output.

With reference to FIG. 2, a weight control algorithm is described next. FIG. 2 shows a beam pattern at a base station in a case where a mobile station #2 acting as interference with respect to a desired mobile station #1, and null forming is carried out such that a null point may be directed toward the mobile station #2. In the figure, $P_{Ti}$ denotes a transmission power from a mobile station i, $P_G(\theta_i)$ denotes a beam gain in an arrival direction $\theta_i$, and $P_{ATT}(r_i)$ denotes a distance attenuation amount for a distance $r_i$. $SIR_1(P_{T1}, P_{T2}, \theta_1, \theta_2, r_1, r_2)$ denotes an SIR (signal power to interference power ratio) after beam forming in the base station for the mobile station #1 which is a desired one, and is expressed by the following formula (1):

$$SIR_1 = [P_{T1} - P_{ATT}(r_1) + P_G(\theta_1)] / [P_{T2} - P_{ATT}(r_2) + P_G(\theta_2)] \qquad (1)$$

At this time, assuming that a moving speed vector of the mobile station #2 is fixed, angle velocities, i.e., phase changes $\Delta\theta_{2a}$ and $\Delta\theta_{2b}$ for respective distances $r_{sa}$ and $r_{2b}$ between the base station and mobile station #2 are different from one another, as shown in FIG. 3 ($\Delta\theta_{2a} < \Delta\theta_{2b}$).

Although FIG. 3 shows a circumferential direction in which the phase change becomes maximum for the purpose of simplification, it is not necessary to limit thereto. Further, the moving speed vector $\vec{V}$ may have an arbitrary value, and also, there is no limitation to a position of the mobile station. Although the moving speed is assumed to be fixed for the purpose of comparative explanation, generality is maintained even if the moving speed changes at respective positions. Furthermore, although description is made assuming that only the mobile station acting as interference moves for the purpose of simplification of description, the same discussion can be applied, by considering a relative speed of the mobile station #2 with respect to the mobile station #1 even in a case where rather the mobile station #1 which is a desired one moves. Further, in this example, transmission power control (TPC) is carried out so that received power may be fixed in the base station $[P_{t2} - P_{ATT}(r_2) = P_{t1} - P_{ATT}(r_1)]$.

Japanese Laid-open Patent Application No. 2001-251233 discloses a use of an arrival direction DoA required in receiving, for transmission beam forming in an FDD system using different frequencies for uplink and downlink channels.

Japanese Laid-open Patent Application No. 2001-203630 discloses forming a beam with DoA information, estimating of a position of a mobile station, estimating a traffic therewith as well as DoA information, further forming a beam in a direction in which the traffic is large, and thereby, reducing call collision probability at a time of random access.

Japanese Laid-open Patent Application No. 8-285934 discloses detecting an interference station by collecting information from all the directions at a time of intermittent reception, and carrying out null forming. Japanese Laid-open Patent Application No. 2000-505254 and Japanese Laid-open Patent Application No. 2002-523969 disclose null forming.

Japanese Laid-open Patent Application No. 2003-92548, Japanese Laid-open Patent Application No. 2003-87189 and Japanese Laid-open Patent Application No. 2003-92549 disclose methods of calibration for an adaptive array antenna.

Japanese Laid-open Patent Application No. 2002-508889 discloses beam forming between an own station which receives influence from a new terminal and a terminal with which communication has been already made, when the new terminal for which communication is made newly occurs.

Japanese Laid-open Patent Application No. 2003-51775 discloses forming a null for an interference station, and carrying out steering the thus-formed beam according to a least mean square method.

Japanese Laid-open Patent Application No. 2002-359588 discloses calculating an initial value of beam forming for a terminal for which communication is newly carried out, with the use of beam information for a terminal with which communication has been already carried out, and improving a beam initial pull-in speed.

SUMMARY OF THE INVENTION

In the related art described above, a null point is produced in a fixed beam in a direction of the mobile station #2, and steering for the mobile station #2 is carried out. As a result, when the mobile station moves at a high speed around the base station, it may not be possible to steer in a large change in phase. In other words, null forming performance is determined based on steering performance around the base station. Beam gain changing amounts $\Delta P_{G2a}$ and $\Delta P_{G2b}$ in the base station after respective phase changes $\Delta\theta_{2a}$ and $\Delta\theta_{2b}$ are such that, as shown in FIGS. 4 and 5, the mobile station #2b existing around the base station has the larger value ($\Delta P_{G2b}$), and the received power from the interference station in the base station is larger from the mobile station #2b. As a result, the SIRs in the base station are expressed by the following formula after the movement:

$$SIR_1(P_{T1}, P_{T2a}, \theta_1, \theta_{2a}, r_1, r_{2a}) >> SIR_1(P_{T1}, P_{T2b}, \theta_1, \theta_{2b}, r_1, r_{2b})$$

In order to avoid such a situation and maintain the SIR in the base station constant, higher null steering performance is required. Accordingly, in order to provide a uniform characteristic within a cell, null steering performance responding to a phase change amount determined from a distance between the base station and the mobile station is required. Accordingly, characteristic deterioration may occur when the mobile station moves at a high speed around the base station with insufficient steering performance.

Further, in general, a degree of sharp falling at a null point, i.e., a null width is set as being minimum which can be produced by a number of antenna elements given, such that received power at a cell edge (reception quality: the same in the SIR) may be not less than a system design, and thereby, maximization of a cell radius is achieved. However, a phase change amount is small at a cell edge at a time of high speed movement as mentioned above, and, therefrom, it can be seen that complete complementary relationship holds between the null width and the distance between the base station and the mobile station, i.e., the phase change amount. That is, the phase change amount is small when the beam width is small, and, in other words, in a case of long distance communication. On the other hand, in a case of short distance communication, the phase change amount is large, and, the beam width should not be set to be a minimum value, in other words, it is not necessary to generate a null point in a sharp manner. This is because a required reception quality can be obtained even when the null point should not be formed so sharply.

Further, in any of the above-mentioned eleven Japanese Laid-open Patent Applications, there is no disclosure concerning avoidance of characteristic deterioration occurring at a time of high speed movement of a mobile station.

The present invention has been devised in consideration of the above-mentioned matter, and an object of the present invention is to provide a method of beam forming in an array antenna and an apparatus therefor by which it is possible to steer for a mobile station even it moves at high speed at any position within a cell.

According to a first aspect of the present invention, based on a moving speed and a moving direction of a mobile station acting as interference, and a distance between an array antenna and the mobile station, beam forming is carried out in such a manner that a signal power to interference power ratio may be fixed between before and after the movement without regard to the distance.

Thereby, a beam width is adaptively changed, and thereby, it is possible to steer for a mobile station which moves at a high speed at any position within a cell.

According to a second aspect of the present invention, based on a moving speed and a moving direction of a mobile station acting as interference, and a distance between an array antenna and the mobile station, beam forming is carried out in such a manner that a total sum of signal power to interference power ratios obtained when the mobile station acting as interference moves during a predetermined time interval may be fixed between before and after the movement without regard to the distance.

Thereby, a beam width is adaptively changed, and thereby, it is possible to steer for a mobile station which moves at a high speed at any position within a cell.

According to a third aspect of the present invention, by estimating the distance of the mobile station acting as interference from received power from the mobile station acting as interference from a single antenna of the array antenna, it is possible to know the distance of the mobile station acting as interference, which is applied to the invention described above for the beam forming.

BRIEF DESCRIPTION OF THE DRAWINGS

Other objects and further features of the present invention will become more apparent from the following detailed description when read in conjunction with the accompanying drawings:

FIGS. 7A and 7B illustrate a first embodiment of a weight control algorithm according to the present invention;

FIG. 18 shows a block diagram of an eighth embodiment of an array antenna apparatus according to the present invention;

FIGS. 19A and 19B illustrate an embodiment of weight control algorithm in the apparatus shown in FIG. 18;

DETAILED DESCRIPTION OF THE PREFERRED EMBODIMENTS

Embodiments of the present invention are described with reference to figures.

Figure 6:
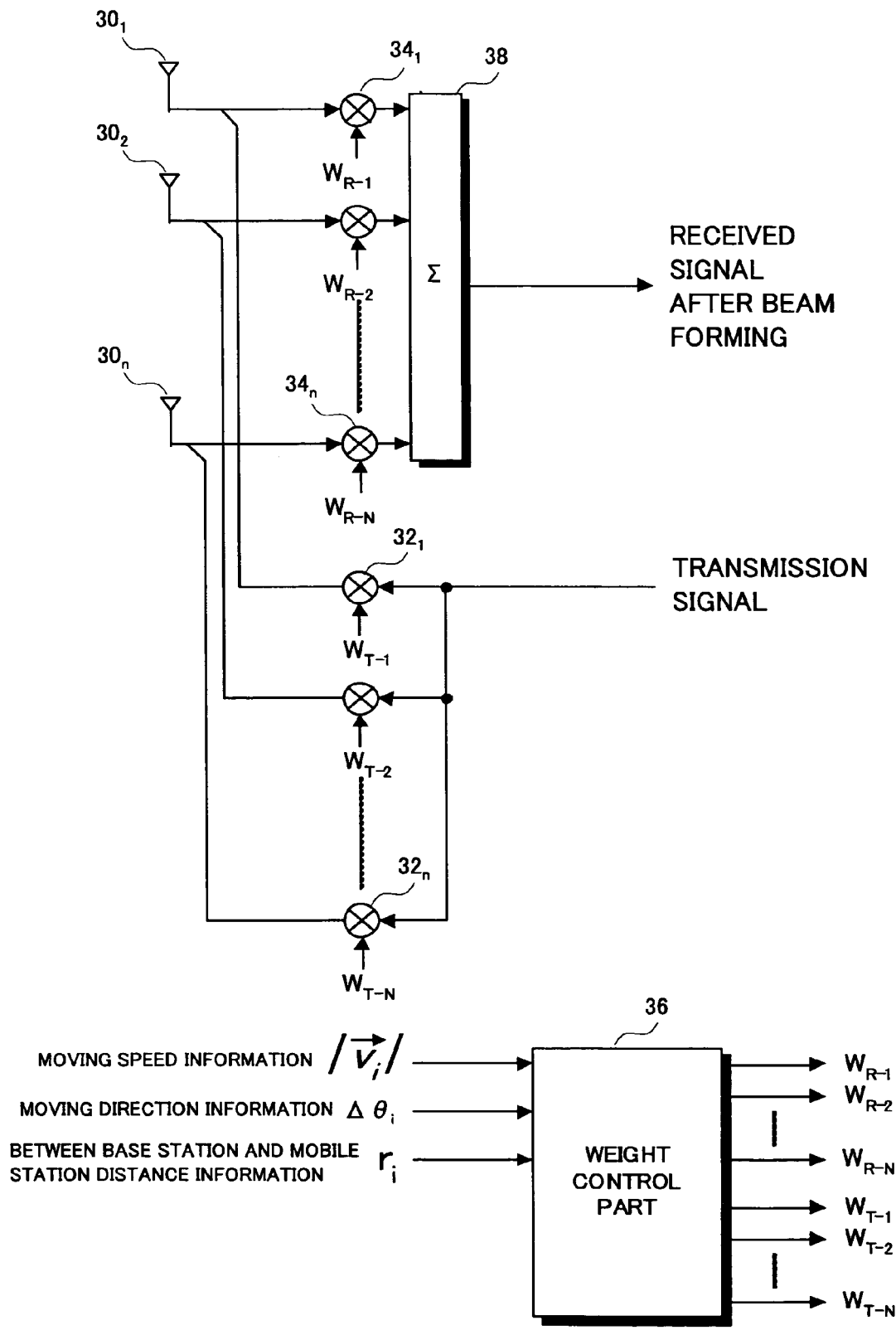
FIG. 6 shows a block diagram of a first embodiment of an array antenna apparatus according to of the present invention.

FIG. 6 shows a block diagram of a first embodiment of an array antenna apparatus according to the present invention. As shown, the apparatus employs N non-directional antennas $30_1$ through $30_n$, a weight vector $W_T$ for forming a beam for transmission, given to multipliers $32_1$ through $32_n$ is expressed as $|w_{T-1}, w_{T-2}, \ldots, w_{T-N}|$, while a weight vector $W_R$ for forming a beam for reception, given to multipliers $34_1$ through $34_n$ is expressed as $|w_{R-1}, w_{R-2}, \ldots w_{R-N}|$.

A weight control part 36 operates a convergence algorithm such as that of a steepest descent method (LMS: Least Mean Squire) or such based on moving direction information $\Delta\theta_i$ from moving speed information (an absolute value of a moving speed vector $|\vec{V}_i|$) and the moving direction information $\Delta\theta_i$ of a mobile station #i acting as interference, as well as a distance $r_i$ between a base station and the mobile station #i, and carries out reception null forming so as to generate the weight vector $W_T$ for forming transmission beam and the weight vector $W_R$ for forming receiving beam.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the mobile station and the base station. Output signals from the multipliers $34_1$ through $34_n$ are added together in an adding part 38. The null control rule according to the present invention is also applied for transmission null forming as it is.

Figure 1:
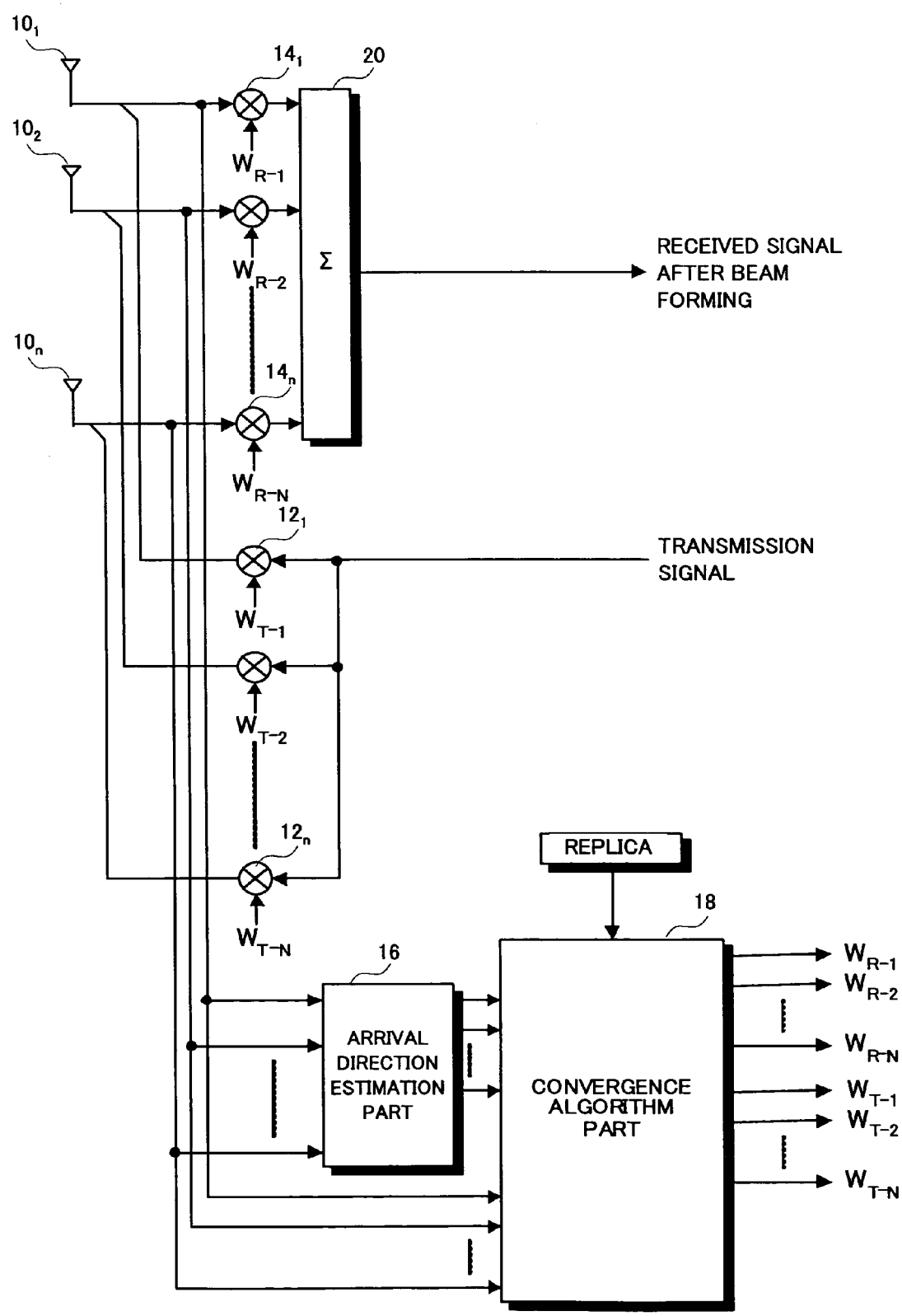
FIG. 1 shows a block diagram of an apparatus applying a null forming method in the related art.
Figure 2:
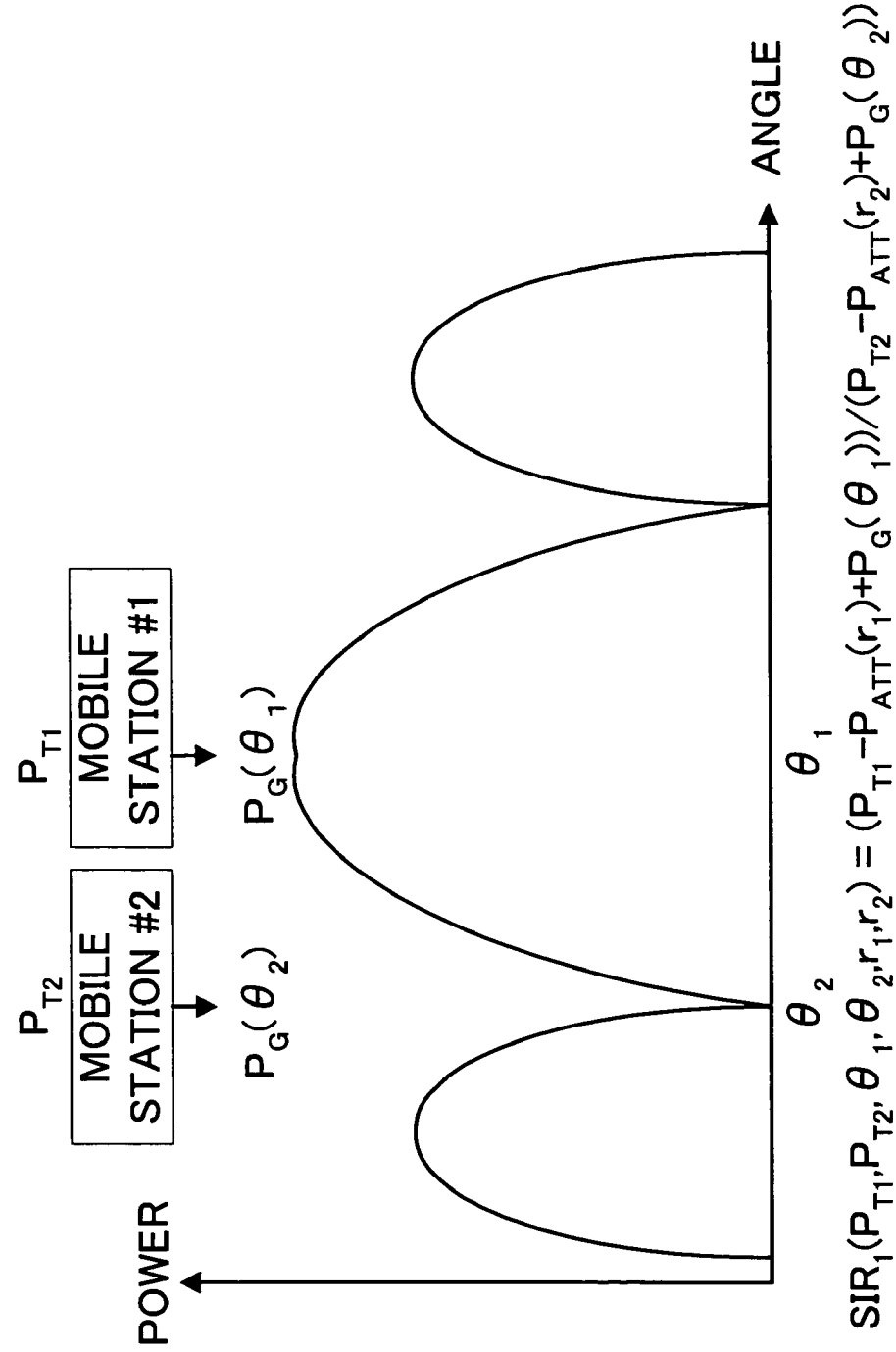
FIG. 2 illustrates a weight control algorithm in the related art.
Figure 3:
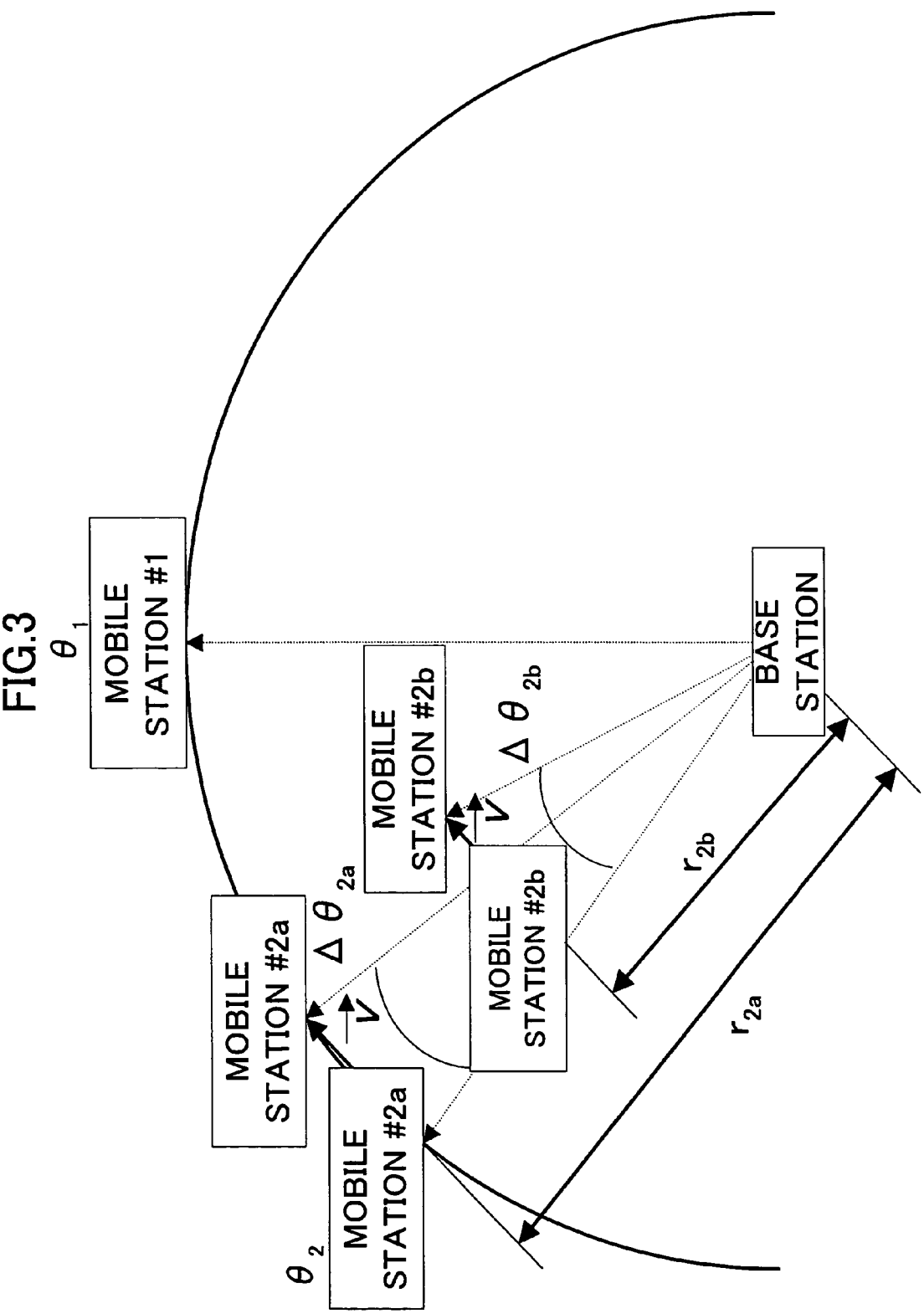
FIG. 3 illustrates a phase change in relation to a distance of a mobile station.
Figure 4:
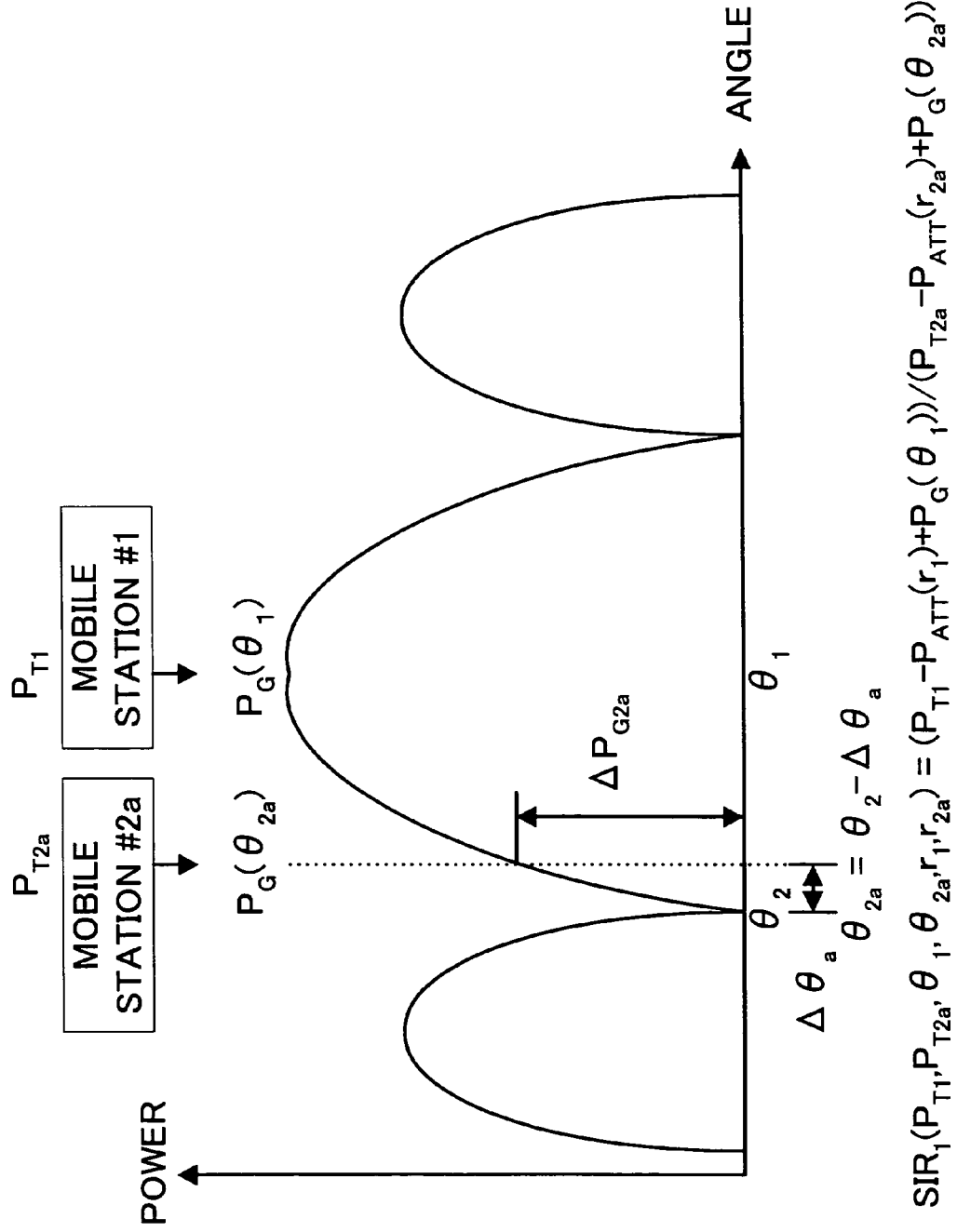
FIGS. 4 and 5 illustrate a beam control in the related art.
Figure 5:
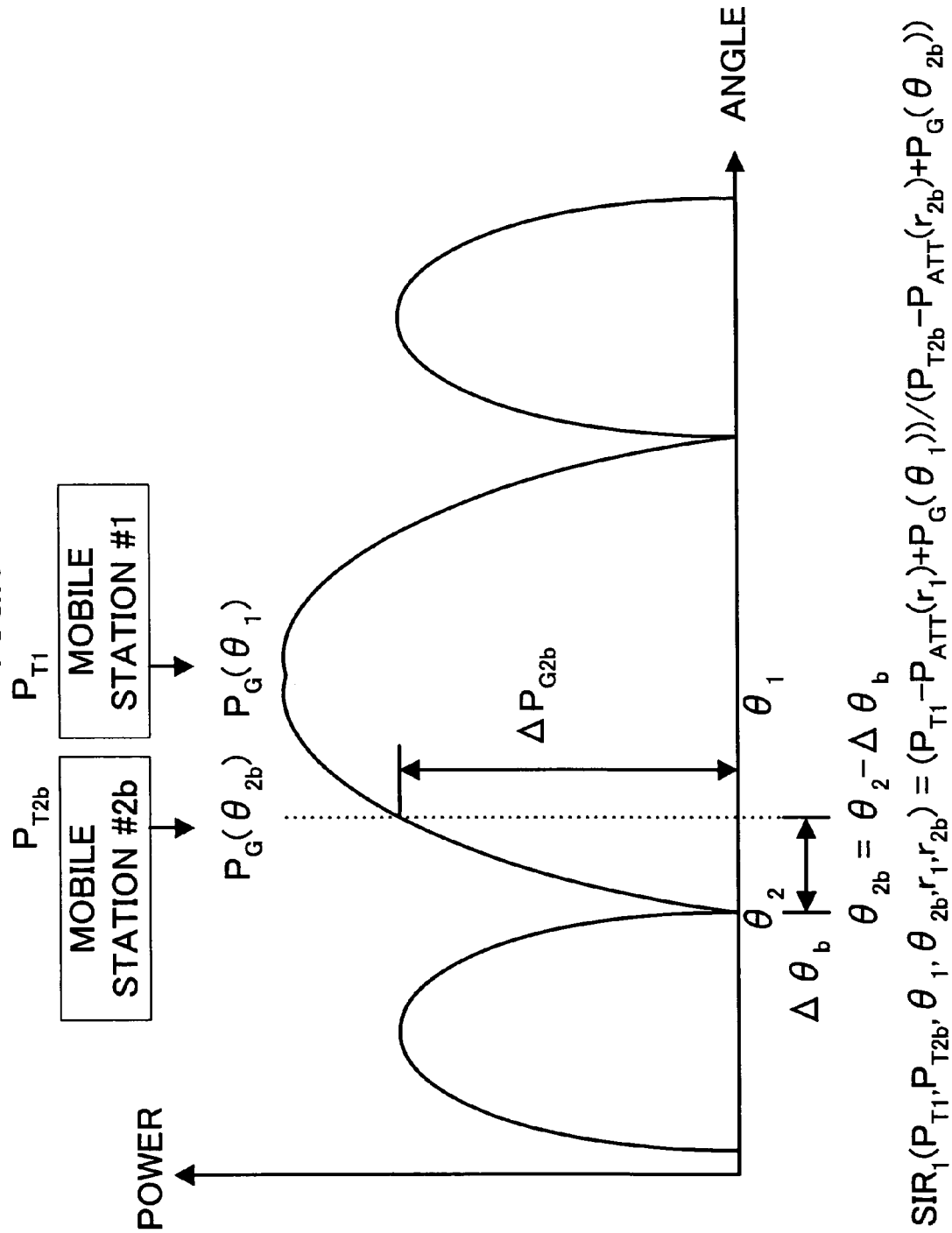

With reference to FIGS. 7A and 7B, a first embodiment of a weight control algorithm according to the present invention carried out by the weight control part 36 is described. In FIG. 7A, received power in a mobile station #1 is expressed by $P_{T1}-P_{ATT}(r_1)+P_G(\theta_1)$. $P_{Ti}$ denotes transmission power from a mobile station #i, $P_G(\theta_i)$ denotes a beam gain in an arrival direction $\theta_i$, $P_{ATT}(r_i)$ denotes a distance attenuation amount for a distance $r_i$. Received power (before movement) from a mobile station #2a shown in FIG. 3 is $P_{T2a}-P_{ATT}(r_{2a})$, and received power (after movement) from the mobile station #2a is $P_{T2a}-P_{ATT}(r_{2a})+\Delta P_{G2a}$. SIR before the movement is such that $SIR_1(P_{T1}, P_{T2a}, \theta_1, \theta_{2a}, r_1, r_{2a})=[P_{T1}-P_{ATT}(r_1)+P_G(\theta_1)]/[P_{T2a}-P_{ATT}(r_{2a})]$, while SIR after the movement is such that $SIR_1(P_{T1}, P_{T2a}, \theta_1, \theta_{2a}, r_1, r_{2a})=[P_{T1}-P_{ATT}(r_1)+P_G(\theta_1)]/[P_{T2a}-P_{ATT}(r_{2a})+\Delta P_{G2a}]$.

In FIG. 7B, received power from the mobile station #1 is expressed by $P_{T1}-P_{ATT}(r_1)+P_G(\theta_1)$. Received power (before the movement) from the mobile station #2b is $P_{T2b}-P_{ATT}(r_{2b})$, and received power (after the movement) of the mobile station #2b is $P_{T2b}-P_{ATT}(r_{2b})+\Delta P_{G2b}$. SIR before the movement is such that $SIR_1(P_{T1}, P_{T2b}, \theta_1, \theta_{2b}, r_1, r_{2b})=[P_{T1}-P_{ATT}(r_1)+P_G(\theta_1)]/[P_{T2b}-P_{ATT}(r_{2b})]$, while SIR after the movement is such that $SIR_1(P_{T1}, P_{T2b}, \theta_1, \theta_{2b}, r_1, r_{2b})=[P_{T1}-P_{ATT}(r_1)+P_G(\theta_1)]/[P_{T2b}-P_{ATT}(r_{2b})+\Delta P_{G2b}]$.

According to the first embodiment, beam forming is carried out such that, SIR for the mobile station #1 in the base station may be always fixed regardless of the distance between the base station and the mobile station, $SIR_1(P_{T1}, P_{T2a}, \theta_1, \theta_{2a}, r_1, r_{2a})=SIR_1(P_{T1}, P_{T2b}, \theta_1, \theta_{2b}, r_1, r_{2b})$ may hold, in other words, a beam gain change amount ($\Delta P_G$) after the movement may be fixed without regard to the distance of the mobile station, that is, $\Delta P_{G2a}=\Delta P_{G2b}$ may hold.

Figure 8:
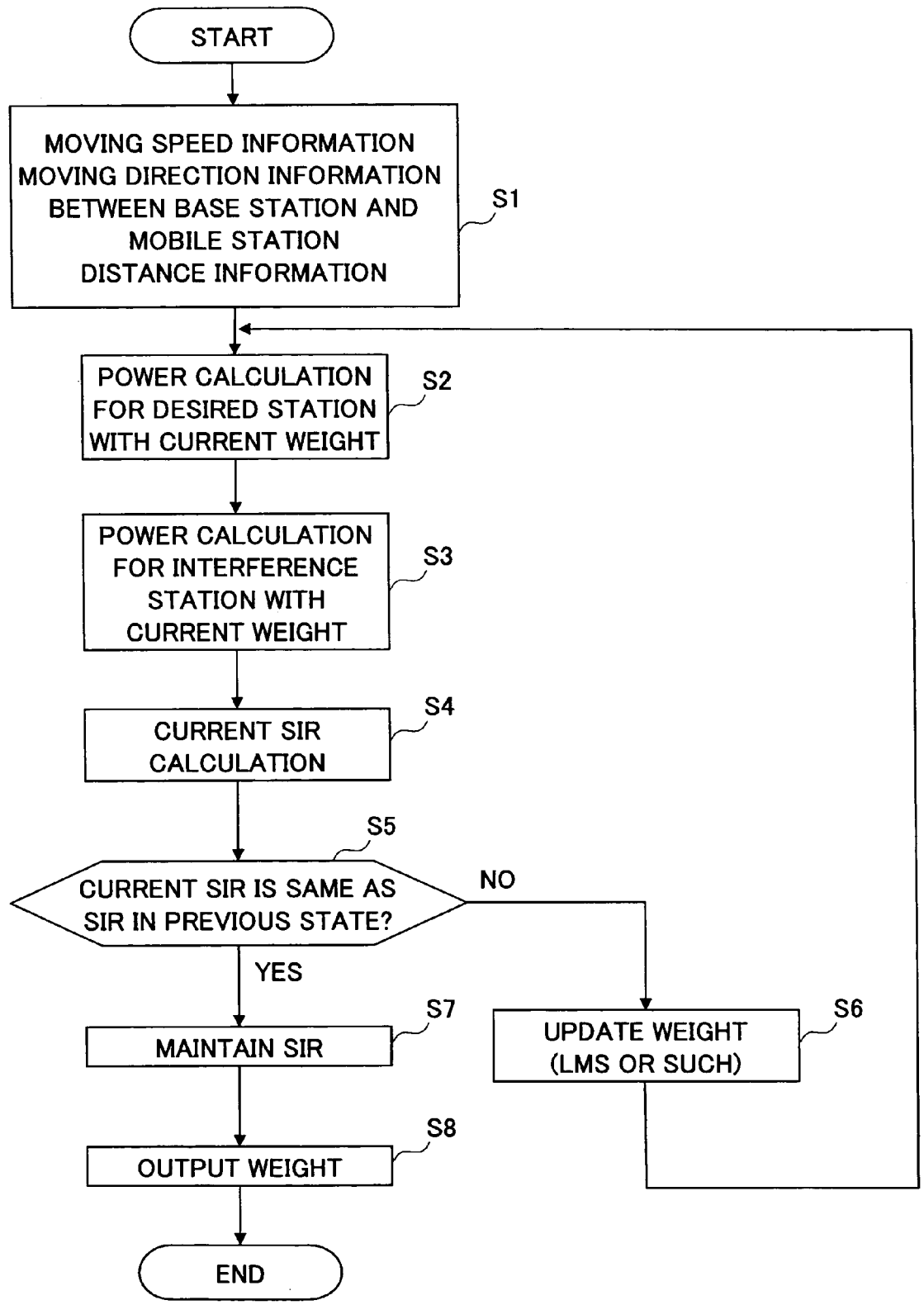
FIG. 8 shows a flow chart of the weight control processing.

FIG. 8 shows a flow chart of the weight control processing according to the first embodiment carried out by the weight control part 36 shown in FIG. 6. As shown, in Step S1, the moving speed information $|\vec{V}_i|$, the moving direction information $\Delta\theta_i$ of the mobile station #i acting as interference, and the distance $r_i$ between the base station and the mobile station #i are read. Then, in Step S2, received power for the desired mobile station #1 is calculated with a current weight. In Step S3, current SIR is calculated from the received power from the mobile station #1 and the received power from the mobile station #i. In Step S5, it is determined whether or not the current SIR is same as SIR in a previous condition.

When the current SIR is not identical to the SIR in the previous condition, the weight is updated in Step S6, and the current operation flow returns to Step S2. Steps S2 through S6 are then repeated. When the current SIR becomes identical to the SIR in the previous condition, the operation flow is proceeded with from Step S5 to Step S7. Then, the current SIR is held as new SIR in the previous condition. After that, the current weight is output in Step S8, and the current processing is finished.

General LMS is employed for updating the weight in Step S6. In the LMS control is made such that a squire error $e(t)^2=[d(t)-y(t)]^2$ may become 0 where d(t) denotes a desired signal while y(t) denotes a signal after the beam forming.

Figure 9A:
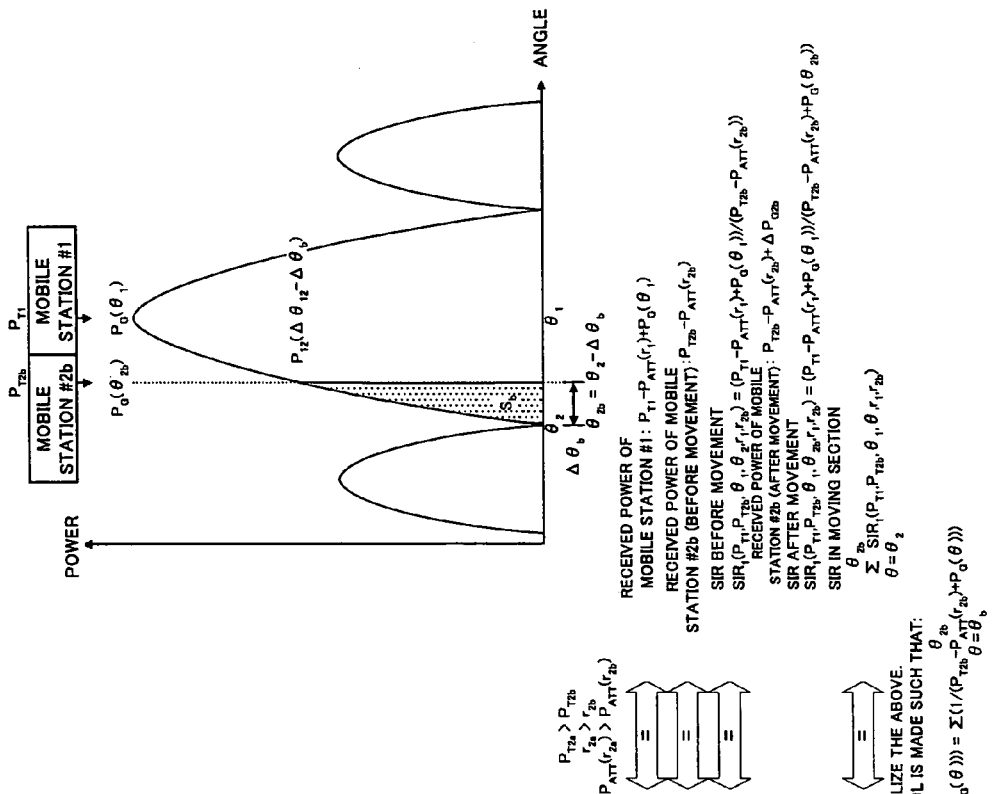
FIGS. 9A and 9B illustrate a second embodiment of a weight control algorithm according to the present invention.
Figure 9B:
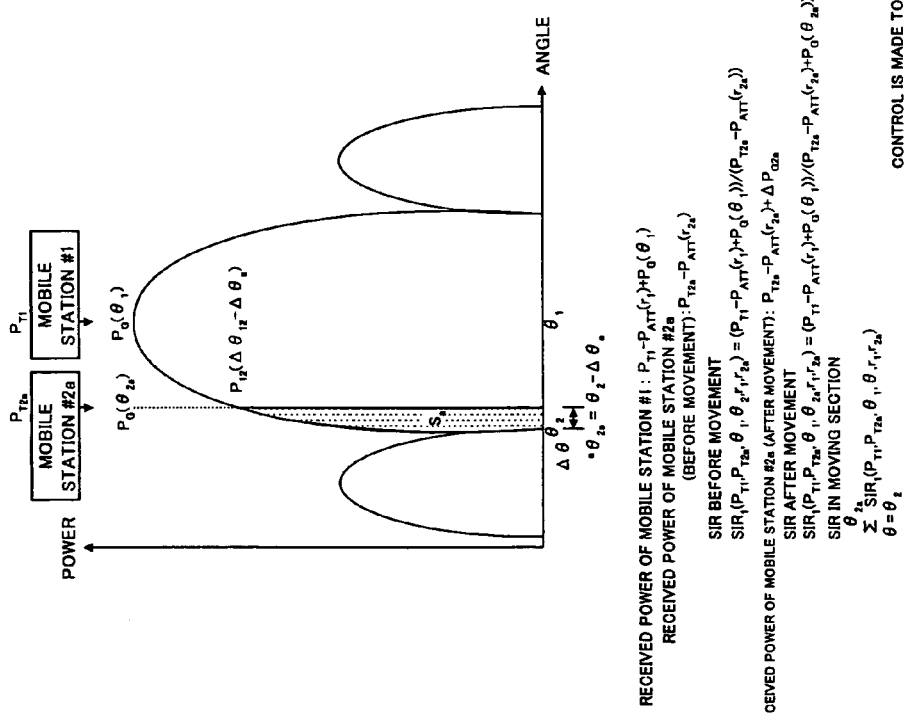

With reference to FIGS. 9A and 9B, a second embodiment of weight control processing according to the present invention carried out by the weight control part 36 is described.

In FIG. 9A, the received power from the mobile station #1 is expressed by $P_{T1}-P_{ATT}(r_1)+P_G(\theta_1)$, the received power (before the movement) from the mobile station #2a shown in FIG. 3 is $P_{T2a}-P_{ATT}(r_{2a})$, and the received power (after the movement) from the mobile station #2a is $P_{T2a}-P_{ATT}(r_{2a})+\Delta P_{G2a}$. The SIR before the movement is such that $SIR_1(P_{T1},$ $P_{T2a}$, $\theta_1$, $\theta_{2a}$, $r_1$, $r_{2a}$)=[$P_{T1}$−$P_{ATT}$($r_1$)+$P_G$($\theta_1$)]/[$P_{T2a}$−$P_{ATT}$($r_{2a}$)], while the SIR after the movement is such that $SIR_1$($P_{T1}$, $P_{T2a}$, $\theta_1$, $\theta_{2a}$, $r_1$, $r_{2a}$)=[$P_{T1}$−$P_{ATT}$($r_1$)+$P_G$($\theta_1$)]/[$P_{T2a}$−$P_{ATT}$($r_{2a}$)+$\Delta P_{G2a}$]. A total sum Sa of the SIRs for a moving section is expressed by the following formula (2):

$$Sa = \sum_{\theta=\theta_2}^{\theta_{2a}} SIR_1(P_{T1}, P_{Ta2}, \theta_1, \theta, r_1, r_{2a}) \quad (2)$$

In FIG. 9B, the received power from the mobile station #1 is expressed by $P_{T1}$−$P_{ATT}$($r_1$)+$P_G$($\theta_1$), the received power (before the movement) from the mobile station #2b is $P_{T2b}$−$P_{ATT}$($r_{2b}$), and the received power (after movement) of the mobile station #2b is $P_{T2b}$−$P_{ATT}$($r_{2b}$)+$\Delta P_{G2b}$. The SIR before movement is such that $SIR_1$($P_{T1}$, $P_{T2a}$, $\theta_1$, $\theta_{2b}$, $r_1$, $r_{2b}$)=[$P_{T1}$−$P_{ATT}$($r_1$)+$P_G$($\theta_1$)]/[$P_{T2b}$−$P_{ATT}$($r_{2b}$)], while the SIR after movement is such that $SIR_1$($P_{T1}$, $P_{T2b}$, $\theta_1$, $\theta_{2b}$, $r_1$, $r_{2b}$)=[$P_{T1}$−$P_{ATT}$($r_1$)+$P_G$($\theta_1$)]/[$P_{T2b}$−$P_{ATT}$($r_{2b}$)+$\Delta P_{G2b}$]. A total sum Sb of the SIRs for a moving section is expressed by the following formula (3):

$$Sb = \sum_{\theta=\theta_2}^{\theta_{2b}} SIR_1(P_{T1}, P_{Tb2}, \theta_1, \theta, r_1, r_{2b}) \quad (3)$$

In the second embodiment, beam forming is carried out in such a manner that, without regard to the distance between the base station and the mobile station, the total sum of the SIRs for the mobile station #1 for a predetermined sample time interval may be fixed, i.e., Sa=Sb may hold, and thus, the following formula (4) may hold:

$$\sum_{\theta=\theta_2}^{\theta_{2a}} \frac{1}{P_{T2a} - P_{ATT}(r_{2a}) + P_G(\theta)} = \sum_{\theta=\theta_2}^{\theta_{2b}} \frac{1}{P_{T2b} - P_{ATT}(r_{2b}) + P_G(\theta)} \quad (4)$$

Thus, the beam width for the null point is narrowed and falling of the beam is made sharp in a case where the distance $r_i$ is large (for example, at a cell edge), while, the beam width for the null point is widen and falling of the beam is made gentle in a case where the distance $r_i$ is small (for example, around the base station). Thereby, the steering performance is maintained at a constant level, and thus, stable operation is achieved even under a condition of high speed movement of the mobile station.

Figure 10:
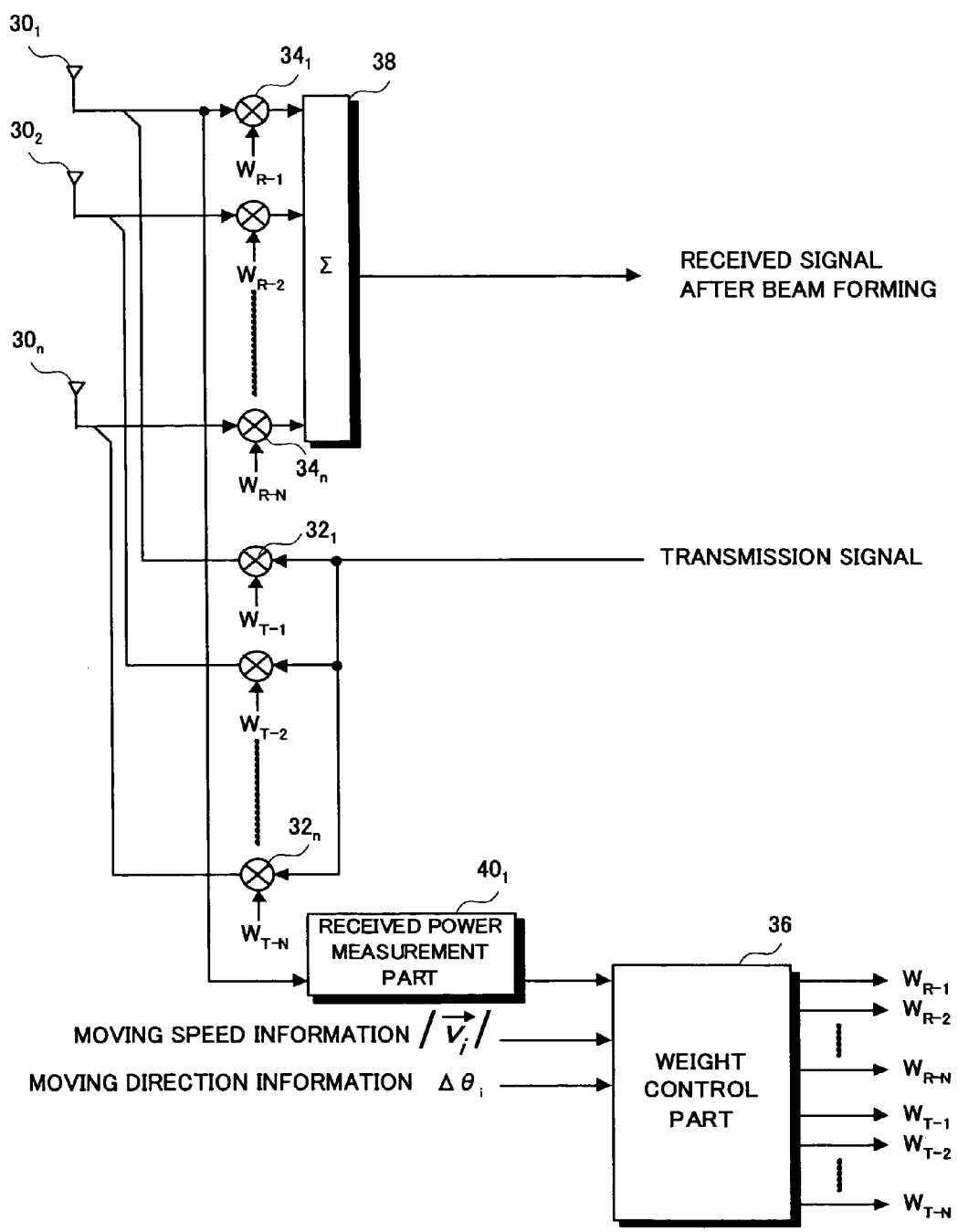
FIG. 10 shows a block diagram of a second embodiment of an array antenna apparatus according to the present invention.

FIG. 10 shows a block diagram of a second embodiment of an array antenna apparatus according to the present invention. In this figure, the same reference numerals as those shown in FIG. 6 are given to identical parts, and duplicated description is omitted. As shown, N non-directional antennas $30_1$ through $30_n$ are used, a weight vector $W_T$ for transmission beam forming given to multipliers $32_1$ through $32_n$ is expressed by |$w_{T-1}$, $w_{T-2}$, . . . , $w_{T-N}$| and a weight vector $W_R$ for reception beam forming given to multipliers $34_1$ through $34_n$ is expressed by |$w_{R-1}$, $w_{R-2}$, . . . , $w_{R-N}$|.

Before weighting for a single antenna $3\theta_1$, i.e., a received signal of the omni (non-directional) antenna is supplied to a received power measurement part $40_1$, received power from each mobile station is measured, the distance attenuation amount $P_{ATT}(r_i)$ and the distance $r_i$ are estimated, and are supplied to the weight control part 36. Separation of received signals from the respective mobile stations is carried out by a method depending on a multiplexing method applied, and, for example, in a case of CDMA, a spreading code assigned for each mobile station is used and de-spreading is carried out for this purpose.

The distance attenuation amount $P_{ATT}(r_i)$ is approximated by Po+γ×10 log($r_i$). Po denotes an attenuation amount [dB] at a cell edge, and γ denotes a constant applied to a distance attenuation rule. In the approximation formula, a correction term may be applied depending on an actual operation environment at a time of cell design, and, a distance is estimated from the distance attenuation amount.

The weight control part 36 operates a convergence algorithm such as a steepest descent method (LMS: Least Mean Squire) or such based on the moving direction information $\Delta\theta_i$ from the moving speed information (the absolute value of a moving speed vector |$\vec{V}_i$|) and the moving direction information $\Delta\theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming receiving beam.

For example, each mobile station has a GPS (global positioning system) receiving part, obtains positional information of the own station therefrom, and transmits the positional information to the base station periodically. The base station calculates, from change in the received positional information of each mobile station, the moving speed information and the moving direction information.

In the present embodiment, the received signal from the single antenna $30_1$ is supplied to the received power measurement part $40_1$ and the distance $r_i$ is estimated. However, an antenna having the maximum received power may be selected from among the antennas $30_1$ through $30_n$, and the distance $r_i$ may be estimated form the received signal therefrom.

Figure 11:
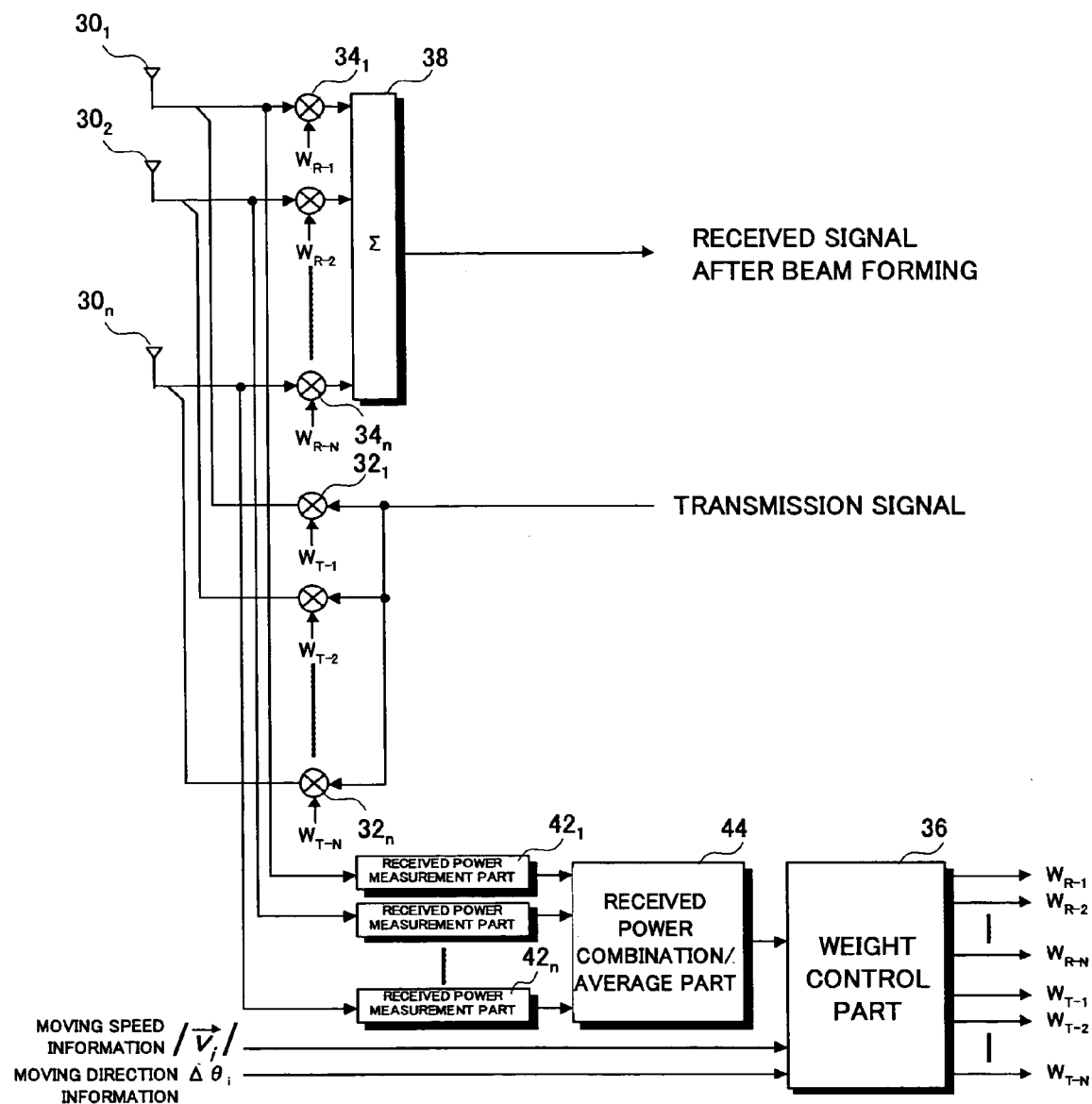
FIG. 11 shows a block diagram of a third embodiment of an array antenna apparatus according to the present invention.

FIG. 11 shows a block diagram of a third embodiment of an array antenna apparatus according to the present invention. In this figure, the same reference numerals as those shown in FIG. 6 are given to identical parts, and duplicated description is omitted. As shown, N non-directional antennas $30_1$ through $30_n$ are used, a weight vector $W_T$ for transmission beam forming given to multipliers $32_1$ through $32_n$ is expressed by |$w_{T-1}$, $w_{T-2}$, . . . , $w_{T-N}$|, and a weight vector $W_R$ for reception beam forming given to multipliers $34_1$ through $34_n$ is expressed by |$w_{R-1}$, $w_{R-2}$, . . . , $w_{R-N}$|.

Received signals from the N antennas $30_1$ through $30_n$ before weighting are supplied to received power measurement parts $42_1$ through $42_n$, received power from each mobile station is measured by each of the received power measurement parts $42_1$ through $42_n$, the thus-obtained measurement values are combined/averaged by a received power combination/average part 44, the distance attenuation amount $P_{ATT}(r_i)$ and the distance $r_i$ are estimated with the use of the thus-obtained averaged received power, and the thus-obtained information is supplied to the weight control part 36. The received signals from only m (m<N) antennas may be combined/averaged instead of the same processing with the use of the signals from all the N antennas.

The weight control part 36 then operates a convergence algorithm such as a steepest descent method (LMS: Least Mean Squire) or such based on the moving direction information $\Delta\theta_i$ from the moving speed information (the absolute value of a moving speed vector |$\vec{V}_i$|) and the moving direction information $\Delta\theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming reception beam.

For example, each mobile station has a GPS (global positioning system) receiving part, obtains positional information of the own station therefrom, and transmits the positional information to the base station periodically. The base station calculates, from change in the received positional information of each mobile station, the moving speed information and the moving direction information.

Figure 12:
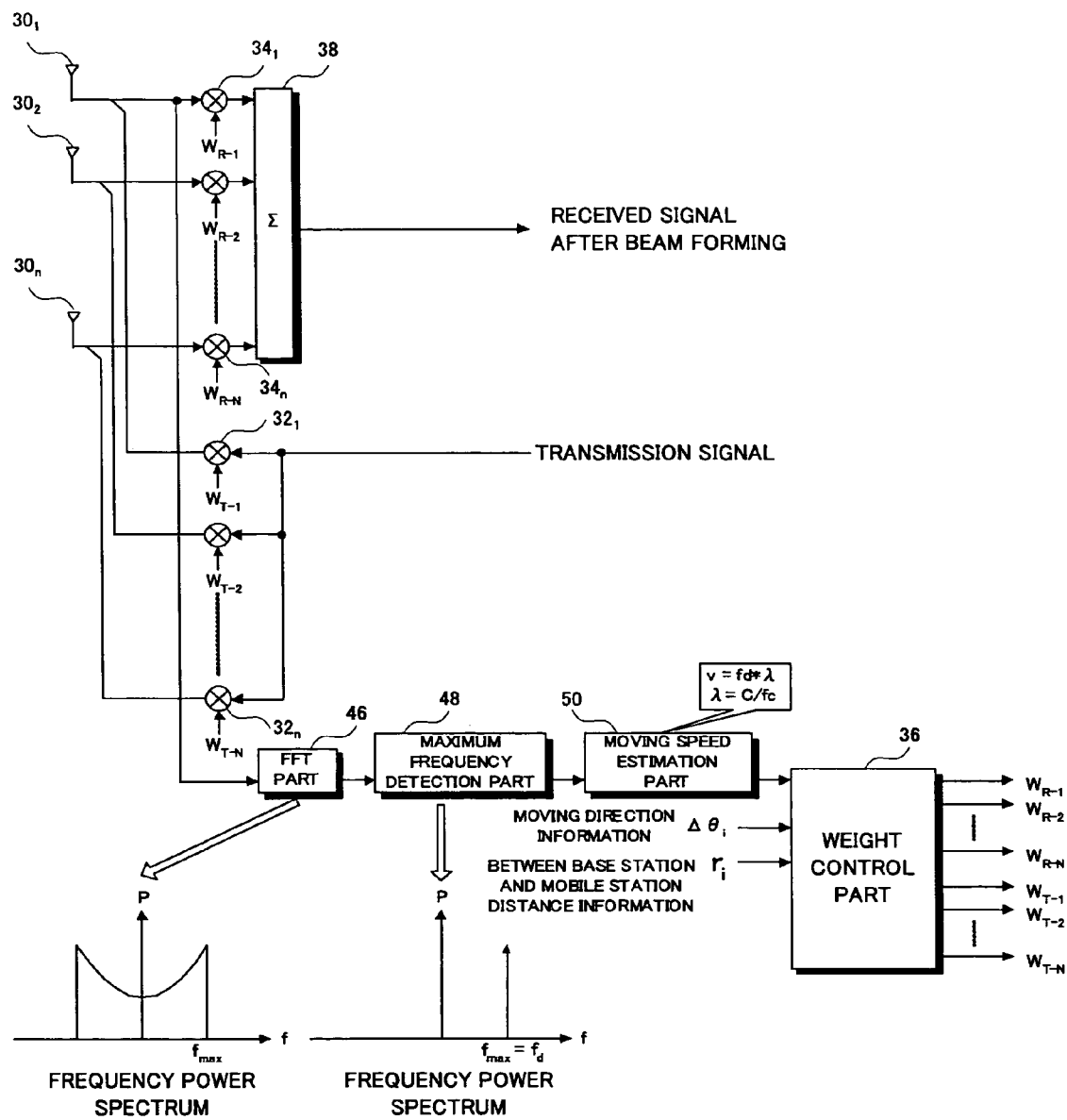
FIG. 12 shows a block diagram of a fourth embodiment of an array antenna apparatus according to the present invention.

FIG. 12 shows a block diagram of a fourth embodiment of an array antenna apparatus according to the present invention. In this figure, the same reference numerals as those shown in FIG. 6 are given to identical parts, and duplicated description is omitted. As shown, N non-directional antennas $30_1$ through $30_n$ are used, a weight vector $W_T$ for transmission beam forming given to multipliers $32_1$ through $32_n$ is expressed by $|w_{T-1}, w_{T-2}, \ldots, w_{T-N}|$, and a weight vector $W_R$ for reception beam forming given to multipliers $34_1$, through $34_n$ is expressed by $|w_{R-1}, w_{R-2}, \ldots, w_{R-N}|$.

Before weighting, a received signal from an omni (non-directional) antenna $30_1$ is supplied to an FFT part 46, which then performs FFT (Fast Fourier Transform), and thereby, a frequency component thereof is obtained, and a maximum Doppler frequency is estimated. Based on the thus-obtained information, the moving speed information (an absolute value $|\vec{V}_i|$ of the moving speed vector, i.e., a moving speed $v_i$) of the mobile station #i is estimated.

The received signal from the omni antenna receives influence from an actual propagation characteristic itself before the directivity thereof is narrowed. Therefore, by carrying out FFT on the received signal, a frequency power spectrum can be observed. In a present specific configuration example, a general reception environment on the side of a mobile station, i.e., a Jake's model which is a spectrum when a path arrival direction is achromatic (i.e., equal path arrival from 360°) is obtained.

Then, a maximum frequency detection part 48 detects a maximum value $f_{max}$ from among the frequency components, and thus, obtains the Doppler frequency $f_d(f_d=f_{max})$. A moving speed estimation part 50 obtains the moving speed $v_i$ from the following formula (5), and supplies it to the weight control part 36:

$$v_i = f_{di} \times \lambda$$
$$= f_{di} \times c / f_c$$

where $\lambda$ denotes a wavelength, c denotes the speed of light (=3×10⁸ [m/s]), and $f_c$ denotes a carrier frequency.

The weight control part 36 then operates a convergence algorithm such as a steepest descent method (LMS: Least Mean Squire) or such based on the moving direction information $\Delta\theta_i$ from the moving speed information (the absolute value of a moving speed vector $|\vec{V}_i|$) and the moving direction information $\Delta\theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming receiving beam.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the base station and the mobile station.

In the present embodiment, the received signal from the single antenna $30_1$ is supplied to the FFT part 46, and therewith, the moving speed $v_i$ is estimated. However, instead, an antenna having the maximum received power may be selected from among the antennas $30_1$ through $30_n$, and the received signal therefrom may be used for the same purpose.

Figure 13:
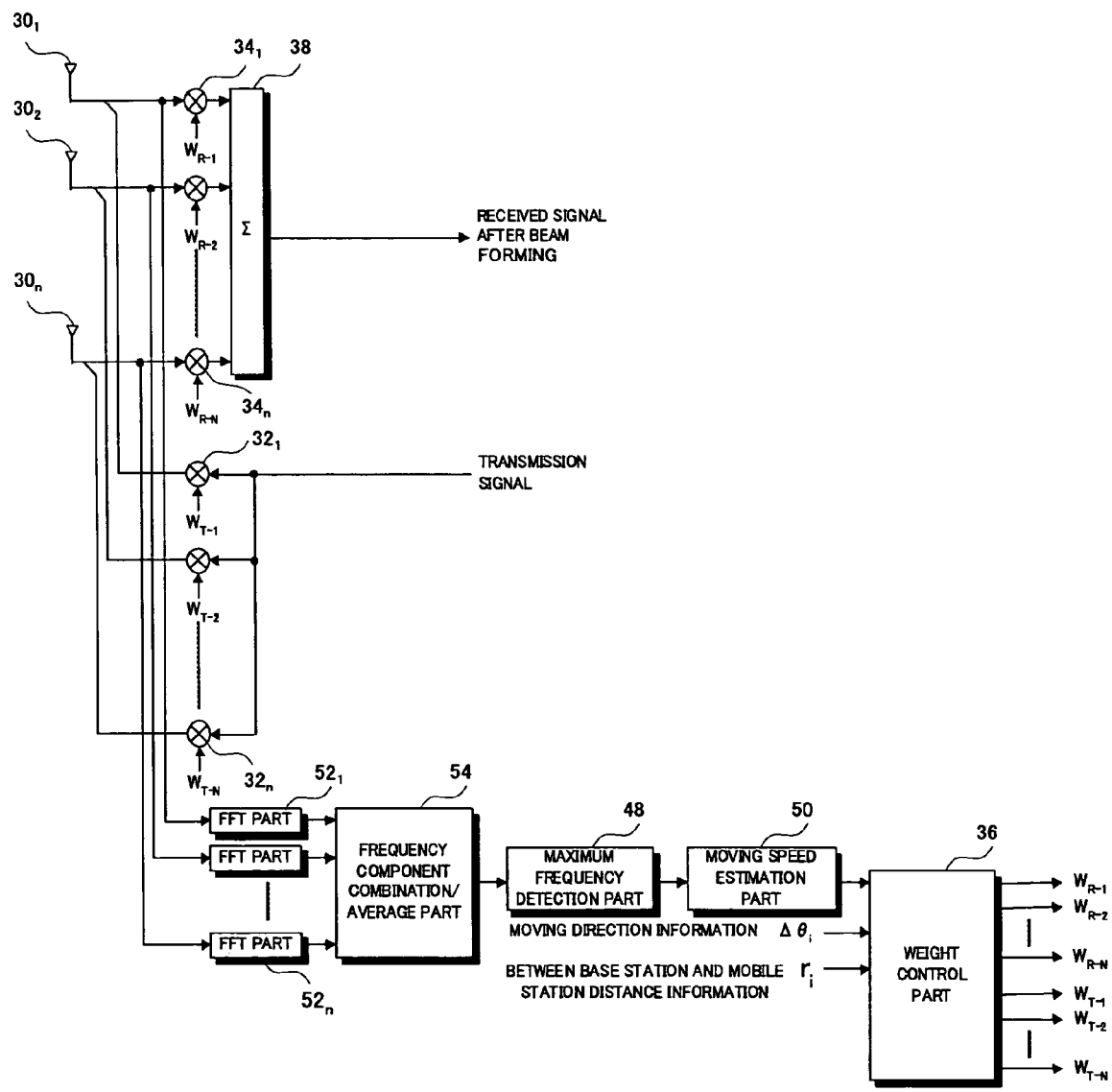
FIG. 13 shows a block diagram of a fifth embodiment of an array antenna apparatus according to the present invention.

FIG. 13 shows a block diagram of a fifth embodiment of an array antenna apparatus according to the present invention. In this figure, the same reference numerals as those shown in FIG. 6 are given to identical parts, and duplicated description is omitted. As shown, N non-directional antennas $30_1$ through $30_n$ are used, a weight vector $W_T$ for transmission beam forming given to multipliers $32_1$, through $32_n$ is expressed by $|w_{T-1}, w_{T-2}, \ldots, w_{T-N}|$, and a weight vector $W_R$ for reception beam forming given to multipliers $34_1$ through $34_n$ is expressed by $|w_{R-1}, w_{R-2}, \ldots, w_{R-N}|$.

Received signals from the N antennas $30_1$ through $30_n$ before weighting are supplied to FFT parts $46_1$ through $46_n$ respectively, each of which then performs FFT (Fast Fourier Transform), a frequency combination/average part 54 combines and averages the thus-obtained frequency components, and a maximum Doppler frequency is estimated therefrom. That is, the maximum value $f_{max}$ is detected from the thus-averaged frequency component in a maximum frequency detection part 48. Thus, the Doppler frequency $f_d$ is obtained. Then, a moving speed estimation part 50 obtains the moving speed $v_i$ from the above-mentioned formula (5), and supplies it to the weight control part 36. Frequency components of the received signals from m (m<N) antennas may be combined and averaged instead of those from all the N antennas.

The weight control part 36 then operates a convergence algorithm such as a steepest descent method (LMS: Least Mean Squire) or such based on the moving direction information $\Delta\theta_i$ from the moving speed information (the absolute value of a moving speed vector $|\vec{V}_i|$) and the moving direction information $\Delta\theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming receiving beam.

For example, each mobile station has a GPS (global positioning system) receiving part, obtains positional information of the own station therefrom, and transmits the positional information to the base station periodically. The base station calculates, from change in the received positional information of each mobile station, the moving speed information and the moving direction information.

Also, combination between the embodiment of FIGS. 10 and 11 and the embodiment of FIGS. 12 and 13 operates without problem.

Figure 14:
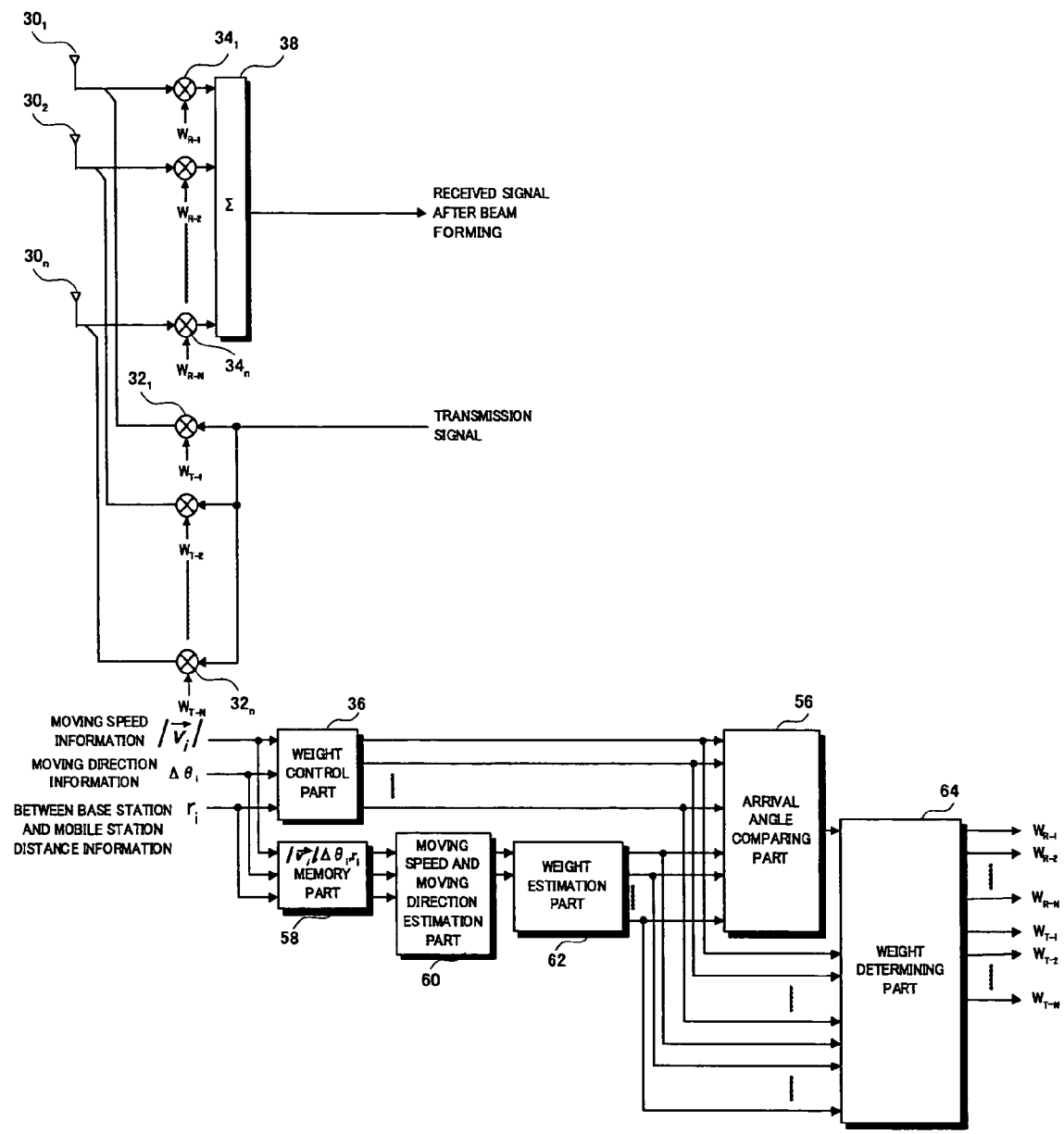
FIG. 14 shows a block diagram of a sixth embodiment of an array antenna apparatus according to the present invention.
Figure 15:
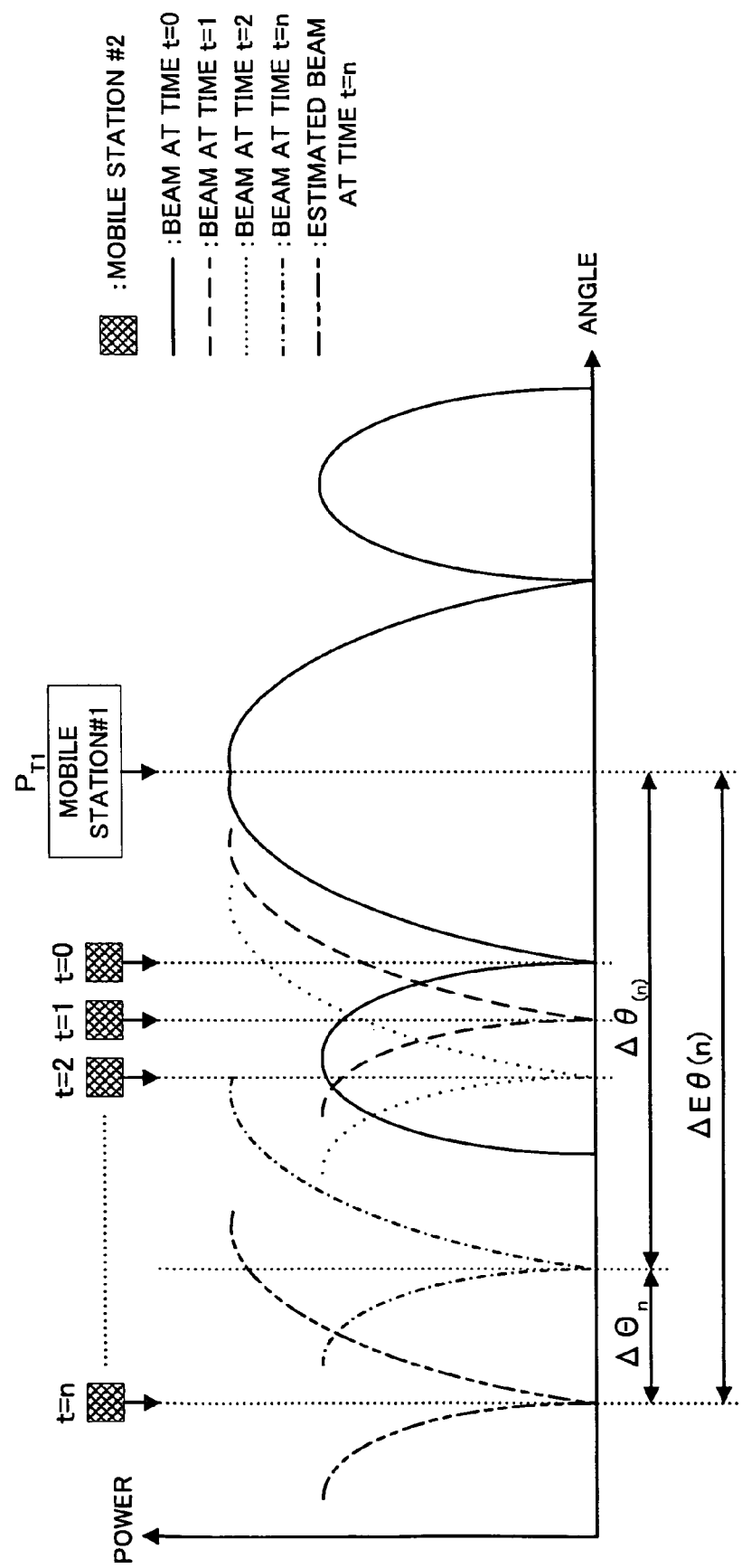
FIG. 15 illustrates an embodiment of the weight control algorithm in the apparatus shown in FIG. 14.

FIG. 14 shows a block diagram of a sixth embodiment of the present invention, and FIG. 15 illustrates an embodiment of the weight control algorithm therefor.

As shown, N non-directional antennas $30_1$ through $30_n$ are used, a weight vector $W_T$ for transmission beam forming given to multipliers $32_1$ through $32_n$ is expressed by $|w_{T-1}, w_{T-2}, \ldots, w_{T-N}|$, and a weight vector $W_R$ for reception beam forming given to multipliers $34_1$ through $34_n$ is expressed by $|w_{R-1}, w_{R-2}, \ldots, w_{R-N}|$.

The weight control part 36 operates a convergence algorithm such as a steepest descent method (LMS: Least Mean Squire) or such based on the moving direction information $\Delta\theta_i$ from the moving speed information (the absolute value of a moving speed vector $|\vec{V}_i|$) and the moving direction information $\Delta\theta_i$ of the mobile station #i acting as interference, as well as a distance $r_i$ between a mobile station and the mobile station #i, and carries out reception null forming so as to generate a weight vector $W_T$ for forming transmission beam and a weight vector $W_R$ for forming receiving beam, which are then supplied to an arrival angle comparing part 56 and to a weight determining part 64 together with the moving direction information $\Delta\theta_i$.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the base station and the mobile station.

A plurality of samples are stored in a memory part 58 for the moving speed information $|\vec{V}_i|$ and the moving direction information $\Delta\theta_i$ of the mobile station #i acting as interference as well as the distance $r_i$ between the base station and the mobile station supplied to the weight control part 36.

In FIG. 15, a certain observation time t=n is assumed. At a time of t=0, 1, 2, . . . , for the mobile station #2 moving on a concentric circle, since a distance r is fixed, a null point of a beam is changed gradually while only $\Delta\theta$ is changed. For the purpose of simplification, it is assumed that the mobile station #2 acting as interference moves on the concentric circle. However, generalization is possible also for a case where the distance changes, or rather the desired mobile station #1 moves.

Then, with the use of the plurality of samples of weight control information (the moving speed information $|\vec{V}_i|$, the moving direction information $\Delta\theta_i$ and the distance $r_i$ between the base station and the mobile station #i) stored in the memory part 58 for $0 \leq t \leq n-1$, a moving speed $|E\vec{V}_i|$ and a moving direction thereof $\Delta E\theta_i$ are estimated. Then, a difference between a moving direction $\Delta E\theta(n)$ of the beam's null point obtained from this estimation for the observation time t and the moving direction information $\Delta\theta(n)$ of the beam's null point calculated from the actual weight control information for the observation time t=n, i.e., $\Delta\Theta_n = |\Delta\theta(n) - \Delta E\theta(n)|$ is obtained. Then, when the difference $\Delta\Theta_n$ exceeds a predetermined threshold value $\Delta\Theta_{th}$, a beam pattern is produced applying the estimated beam's null point as an initial value therefor.

For this purpose, a moving speed and moving direction estimation part 60 estimates the moving speed $|E\vec{V}_i|$ and the moving direction $\Delta E\theta_i$ from the plurality of samples of the moving speed information $|\vec{V}_i|$ and the moving direction information $\Delta\theta_i$ of the mobile station #i acting as interference as well as the distance $r_i$ between the base station and the mobile station stored in the memory part 58, and supplies the estimated values to a weight estimation part 62.

The weight estimation part 62 estimates a path arrival direction DoA of the mobile station #i acting as interference from the estimated moving speed $|E\vec{V}_i|$, estimated moving direction $\Delta E\theta_i$ and the distance $r_i$ (fixed in this case). Then, based on the thus-obtained path arrival direction DoA, the weight estimation part 62 operates a convergence algorithm such as a steepest descent method (LMS: Least Mean Squire) or such, carries out reception null forming so as to generate a weight vector $W_T$ for forming a transmission beam and a weight vector $W_R$ for forming a receiving beam, which are then supplied to an arrival angle comparing part 56 and to a weight determining part 64 together with the estimated moving direction $\Delta E\theta_i$.

The arrival angle comparing part 56 obtains the difference $\Delta\Theta_n$ between the estimated moving direction $\Delta E\theta(n)$ of the beam's null point and the moving direction information $\Delta\theta(n)$ of the beam's null point calculated from the actual weight control information, compares it with the threshold value $\Delta\Theta_{th}$, and supplies the comparison result to a weight determining part 64. When $\Delta\Theta_n < \Delta\Theta_{th}$, the weight determining part 64 selects the weight vector $W_T$ for forming a transmission beam and the weight vector $W_R$ for forming a reception beam obtained from the weight control part 36, and output them, while, the weight determining part 64 selects the weight vector $W_T$ for forming a transmission beam and the weight vector $W_R$ for forming a reception beam obtained from the weight estimation part 62 when $\Delta\Theta_n \geq \Delta\Theta_{th}$, and output the same.

Thereby, it is possible to avoid reduction in the received power otherwise occurring at a time of high speed movement due to an excess of a moving speed exceeding its controllable range at a sampling time. Furthermore, generally speaking, at a time of high speed movement, both the moving speed and the moving direction have small changes, and thus, the estimation accuracy is high.

Figure 16:
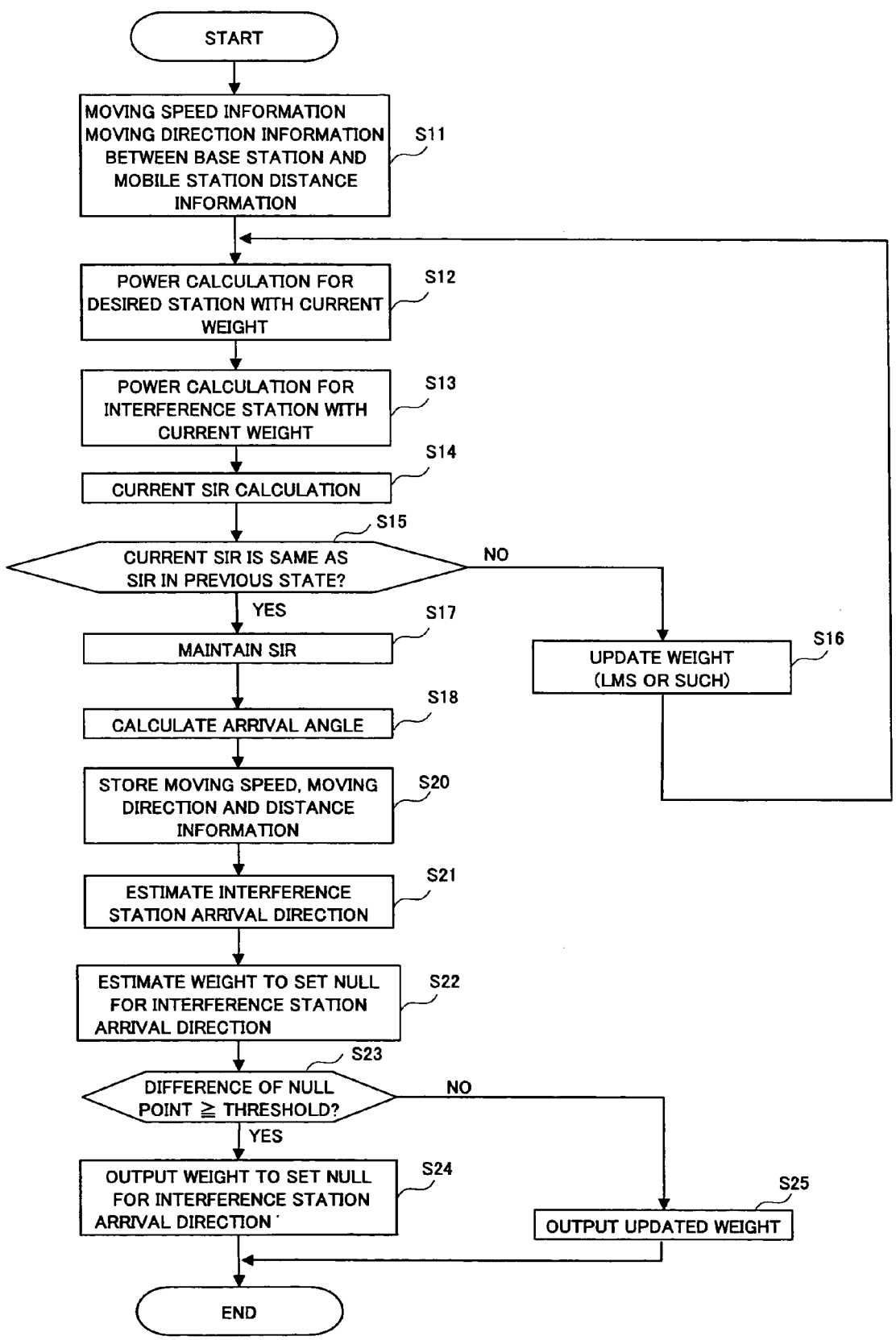
FIG. 16 shows a flow chart of weight control processing according to the present invention shown in FIG. 14.

FIG. 16 shows a flow chart of the weight control processing carried out in the apparatus shown in FIG. 14. As shown, the weight control part 36 reads the moving speed information $|\vec{V}_i|$, the moving direction information $\Delta\theta_i$ of the mobile station #i acting as interference and the distance $r_i$ between the base station and the mobile station #i in Step S11. Then, in Step S12, received power from the desired mobile station #1 is calculated with a current weight, and, in Step S13, received power from the mobile station #i acting as interference is calculated with the current weight. In Step S14, current SIR is calculated from the received power from the mobile station #1 and the received power from the mobile station #i, and, in Step S15, it is determined whether or not the current SIR is same as SIR in the previous state.

When the current SIR is not identical to the SIR in the previous state, the weight is updated in Step S16, the processing is proceeded with to Step S12, and Steps S12 through S16 are repeated. When the current SIR becomes equal to the SIR in the previous state, the current SIR is held as new SIR in the previous state, and, then, in Step S18, the moving direction information $\Delta\theta_i$ is calculated. For the updating of the weight in Step S16, general LMS is employed. In the LMS control is made such that a squire error $e(t)^2 = [d(t) - y(t)]^2$ may become 0 where d(t) denotes a desired signal while y(t) denotes a signal after the beam forming.

Then, in Step S20, the moving speed information $|\vec{V}_i|$, the moving direction information $\Delta\theta_i$ of the mobile station #i acting as interference and the distance $r_i$ between the base station and the mobile station #i read in Step S11 are stored in the memory part 58, and, in Step S21, the moving speed $|E\vec{V}_i|$ and the moving direction $\Delta E\theta_i$ are estimated from the plurality of samples of the moving speed information $|\vec{V}_i|$ and the moving direction information $\Delta\theta_i$ of the mobile station #i acting as interference as well as the distance $r_i$ between the base station and the mobile station #i. Then, in Step S22, from the estimated moving speed $|E\vec{V}_i|$ and estimated moving direction $\Delta E\theta_i$ as well as the distance $r_i$ (fixed in this case), a weight vector $W_T$ for forming a transmission beam and a weight vector $W_R$ for forming a reception beam are generated.

Then, in Step S23, it is determined whether or not the difference $\Delta\Theta_n$ between the estimated moving direction $\Delta E\theta(n)$ of the beam's null point and the moving direction information $\Delta\theta(n)$ calculated from the actual weight information exceeds the threshold value $\Delta\Theta_{th}$. Then, when $\Delta\Theta_n \geq \Delta\Theta_{th}$, the processing is proceeded with to Step S24, and the weight vector $W_T$ for forming a transmission beam and the weight vector $W_R$ for forming a reception beam estimated in Step S22 are selected and output. On the other hand, when $\Delta\Theta_n < \Delta\Theta_{th}$, the processing is proceeded with to Step S25, and the weight vector $W_T$ for forming a transmission beam and the weight vector $W_R$ for forming a reception beam updated in Step S16 are selected, and are output.

Figure 17:
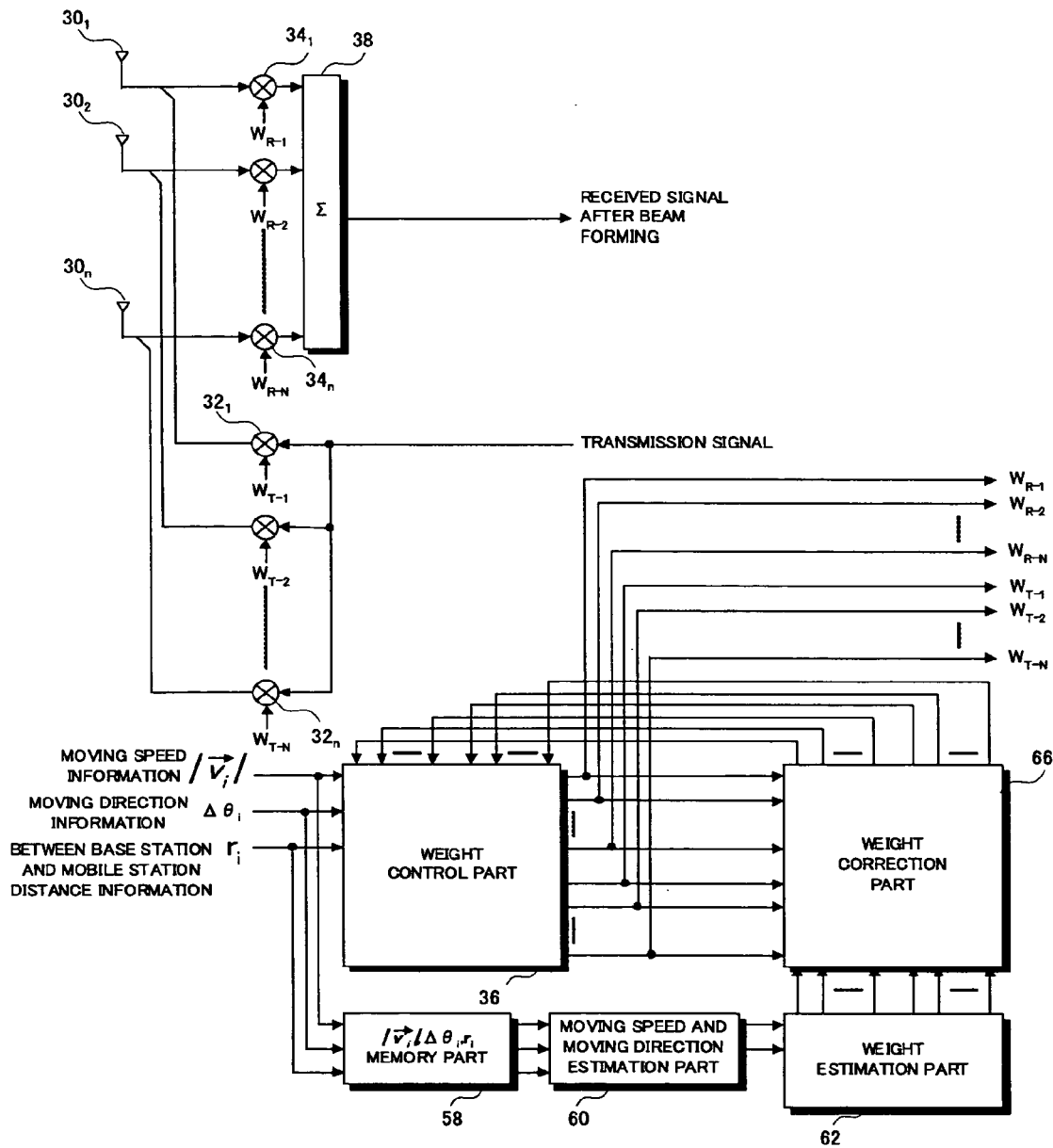
FIG. 17 shows a block diagram of a seventh embodiment of an array antenna apparatus according to the present invention.

FIG. 17 shows a block diagram of a seventh embodiment of an array antenna apparatus according to the present invention. In this embodiment, instead of the arrival angle comparing part 56 and the weight determining part 64 shown in FIG. 14, a weight correction part 66 is provided. To the weight correction part 66, the weight vector $W_T$ for forming a transmission beam, the weight vector $W_R$ for forming a reception beam and the moving direction information $\Delta\theta_i$ are provided from the weight control part 36. Further, the weight estimation part 62 estimates the weight vector $W_T$ for forming a transmission beam and the weight vector $W_R$ for forming a reception beam from the estimated moving speed $|E\vec{V}_i|$, the moving direction information $\Delta\theta_i$ and the distance $r_i$, and supplies the estimated values to the weight correction part 66 together with the estimated moving direction $\Delta E\theta_i$.

The weight correction part 66 obtains a difference $\Delta\Theta_n$ between the estimated moving direction $\Delta E\theta(n)$ of the beam's null point and the moving direction $\Delta E\theta(n)$ of the beam's null point calculated from the actual weight control information, compares it with the threshold $\Delta\Theta_{th}$, and, when $\Delta\Theta_n \geq \Delta\Theta_{th}$, the weight correction part 66 multiplies the difference $\Delta\Theta_n$ with a predetermined correction coefficient, which is then supplied to the weight control part 36 as a correction value in a feedback manner.

After from a time of t=n+1, the weight control part 36 generates the weight vector $W_T$ for forming a transmission beam and the weight vector $W_R$ for forming a reception beam with the use of the thus-supplied correction value in the feedback manner as well as the weight control information (the moving speed information $|\vec{V}_i|$, the moving direction information $\Delta\theta_i$ and the distance $r_i$ between the base station and the mobile station #i). Since the beam transition until now is thus taken over, it is possible to improve the estimation accuracy in beam forming.

FIG. 18 shows a block diagram of an eight embodiment of an array antenna apparatus according to the present invention, and FIGS. 19A and 19B illustrate a weight control algorithm therefor.

As shown in FIG. 18, N non-directional antennas $30_1$ through $30_n$ are used, a weight vector $W_T$ for transmission beam forming given to multipliers $32_1$ through $32_n$ is expressed by $|w_{T-1}, w_{T-2}, \ldots, w_{T-N}|$, and a weight vector $W_R$ for reception beam forming given to multipliers $34_1$ through $34_n$ is expressed by $|w_{R-1}, w_{R-2}, \ldots, w_{R-N}|$.

The weight control part 36 operates a convergence algorithm such as that according to a steepest descent method (LMS: Least Mean Squire) or such based on the moving direction $\Delta\theta_i$ information from the moving speed information (the absolute value of a moving speed vector $|\vec{V}_i|$) and the moving direction information $\Delta\theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming receiving beam, which are then supplied to an arrival angle comparing part 56, an estimated weight arrival angle and power calculation part 68 and a weight determining part 72 together with the moving direction information $\Delta\theta_i$.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the base station and the mobile station.

A plurality of samples of the moving speed information $|\vec{V}_i|$, the moving direction information $\Delta\theta_i$ of the mobile station #i and the distance $r_i$ between the base station and the mobile station supplied to the weight control part 36 are also supplied to and stored in the memory part 58.

A moving speed and moving direction estimation part 60 estimates the moving speed $|E\vec{V}_i|$ and the moving direction $\Delta E\theta_i$ from the plurality of samples of the moving speed information $|\vec{V}_i|$ and the moving direction information $\Delta\theta_i$ of the mobile station #i acting as interference as well as the distance $r_i$ between the base station and the mobile station stored in the memory part 58, and supplies the estimated values to the weight estimation part 62.

The weight estimation part 62 estimates the path arrival direction DoA of the mobile station #i acting as interference from the estimated moving speed $|E\vec{V}_i|$, estimated moving direction $\Delta E\theta_i$ and the distance $r_i$ (fixed in this case). Then, based on the thus-obtained path arrival direction DoA, the weight estimation part 62 operates a convergence algorithm such as that according to a steepest descent method (LMS: Least Mean Squire) or such, carries out reception null forming so as to generate the weight vector $W_T$ for forming a transmission beam and the weight vector $W_R$ for forming a reception beam, which are then supplied to the arrival angle comparing part 56, the estimated weight arrival angle and power calculation part 68 and the weight determining part 72 together with the estimated moving direction $\Delta E\theta_i$.

The arrival angle comparing part 56 obtains a difference $\Delta\Theta_n$ between the estimated moving direction $\Delta E\theta(n)$ of the beam's null point and the moving direction information $\Delta\theta(n)$ of the beam's null point calculated from the actual weight control information, compares it with the threshold value $\Delta\Theta_{th}$, and supplies the comparison result to the weight determining part 72. When $\Delta\Theta_n < \Delta\Theta_{th}$, the weight determining part 72 selects the weight vector $W_T$ for forming a transmission beam and the weight vector $W_R$ for forming a reception beam obtained from the weight control part 36, and output them, while, when $\Delta\Theta_n \leq \Delta\Theta_{th}$ the weight determining part 72 selects the weight vector $W_T$ for forming a transmission beam and the weight vector $W_R$ for forming a reception beam obtained from the weight estimation part 62, and output the same.

At a given moving speed $|\vec{V}_i|$, an interference power suppression amount $\Delta P$ due to a difference in a null point occurring depending on the distance $r_i$ between the base station and the mobile station differs, and the present embodiment responds thereto. The interference power suppression amount ΔP is a difference between the interference power at an actual beam at a time of t=n and the interference power at an estimated beam.

Even when the difference $\Delta\Theta_n$ in the null point is constant ($\Delta\Theta_{na}=\Delta\Theta_{nb}$), the interference power suppression amount $\Delta P_{2a}$ becomes larger since the beam width is narrow when the distance $r_i$ becomes larger, as shown in FIG. 19A. On the other hand, when the distance $r_i$ becomes smaller, as shown in FIG. 19B, since the beam width is wider, the interference power suppression amount $\Delta P_{2a}$ becomes smaller.

Accordingly, when the distance $r_i$ is small, reduction in the received power is small even when the difference $\Delta\Theta_n$ is large. Therefore, in such a case, beam forming with the use of the weight estimated value is not carried out. In this case, actually, at a time of t=n, a beam pattern is formed with the estimated beam's null point as an initial value, when a difference between the interference power at a beam estimated with the use of the weight control information obtained at a time of $0 \leq t \leq n-1$ and the interference power in the difference $\Delta\Theta_n$ in the beam gain pattern obtained from the actual weight control information at the time of t=n, i.e., the interference power suppression amount $\Delta P_n$ exceeds a predetermined threshold $\Delta P_{th}$.

The estimated weight angle and power calculation part 68 obtains an arrival angle (null point) of the interference station according to the output weight from the weight control part 36, and, calculates the interference power suppression amount $\Delta P_n$ according to the estimated weight from the weight estimation part 62 for this null point. The power comparing part 70 determines whether or not the interference power suppression amount $\Delta P_n$ exceeds the threshold value $\Delta P_{th}$, and then, provides the determination result to the weight determining part 72.

In a case where the interference power suppression amount $\Delta P_n$ is less than the threshold $\Delta P_{th}$, the weight determining part 72 selects the output of the weight control part 36, while, when the interference power suppression amount $\Delta P_b$ exceeds the threshold value $\Delta P_{th}$, the weight determining part 72 selects the output of the weight estimation part 62, and the weight determining part 72 uses the thus-selected one as the updated weight.

Figure 20:
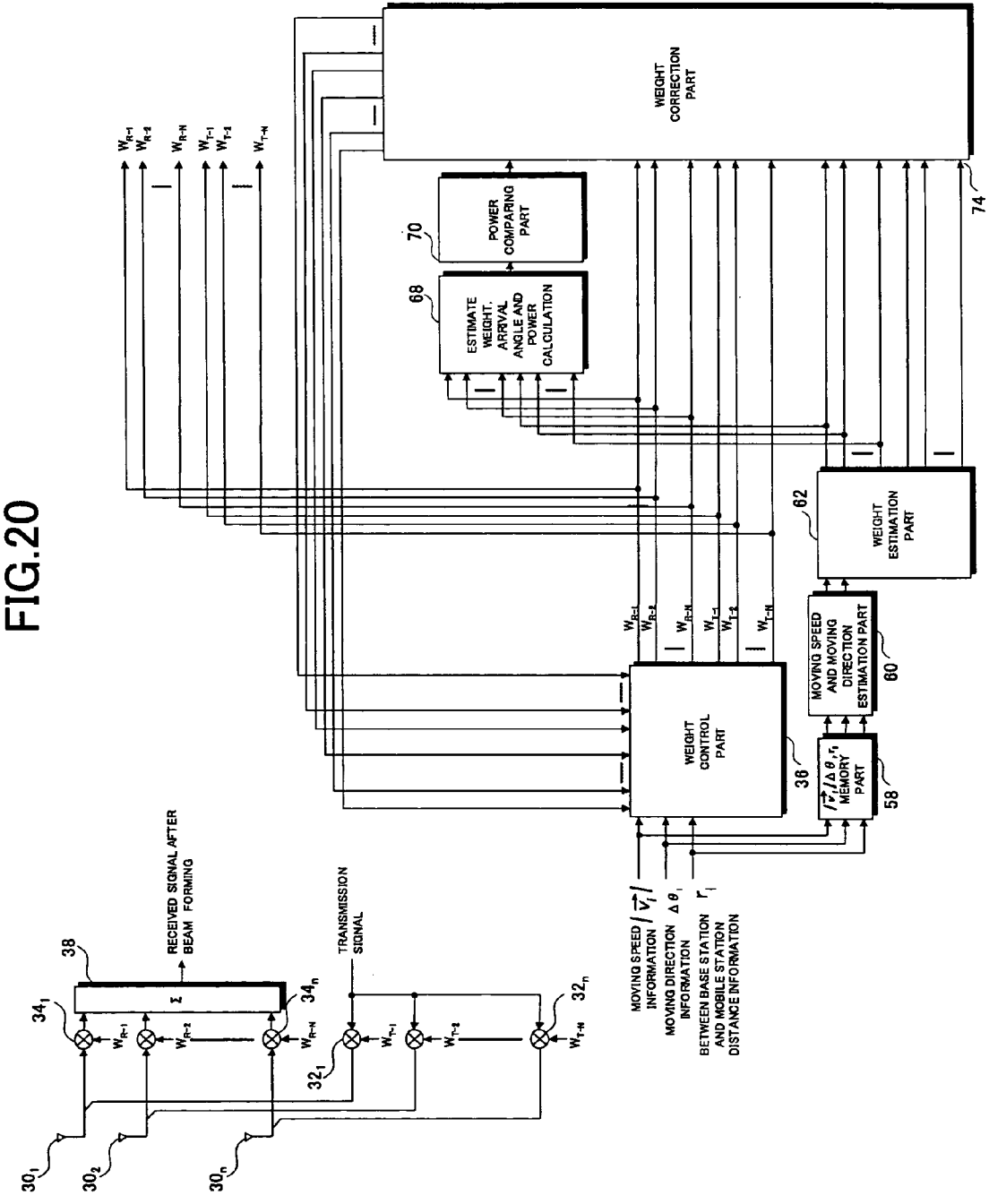
FIG. 20 shows a block diagram of a ninth embodiment of an array antenna apparatus according to the present invention.

FIG. 20 shows a block diagram of a ninth embodiment of an array antenna apparatus according to the present invention. In this embodiment, instead of the arrival angle comparing part 56 and the weight determining part 72 shown in FIG. 18, a weight correction part 74 is provided. To the weight correction part 74, the weight vector $W_T$ for forming a transmission beam, the weight vector $W_R$ for forming a reception beam and the moving direction information $\Delta\theta_i$ are provided from the weight control part 36. Further, the weight estimation part 62 estimates the weight vector $W_T$ for forming a transmission beam and the weight vector $W_R$ for forming a reception beam from the estimated moving speed $|E\vec{V}_i|$, the moving direction information $\Delta\theta_i$ and the distance $r_i$ (fixed in this case), and supplies them to the weight correction part 74 together with the estimated moving direction $\Delta E\theta_i$ as well as output from a power comparing part 70.

When the interference power suppression amount $\Delta P_n$ exceeds the threshold value $\Delta P_{th}$, the weight correction part 74 provides the interference power suppression amount $\Delta P_n$, which is a difference between the beam gain pattern obtained from the actual weight control information at the time of t=n and the estimated beam at the time t=n, as well as the value obtained from multiplying the difference $\Delta\Theta_n$ with the predetermined correction coefficient, as the correction values, to the weight control part 36 in a feedback manner.

After from a time of t=n+1, the weight control part 36 generates the weight vector $W_T$ for forming a transmission beam and the weight vector $W_R$ for forming a reception beam with the use of the thus-supplied correction values in the feedback manner as well as the weight control information (the moving speed information $|\vec{V}_i|$, the moving direction information $\Delta\theta_i$ and the distance $r_i$ between the base station and the mobile station #i). Since the beam transition until now is thus taken over, it is possible to improve the estimation accuracy in the beam forming.

Figure 21:
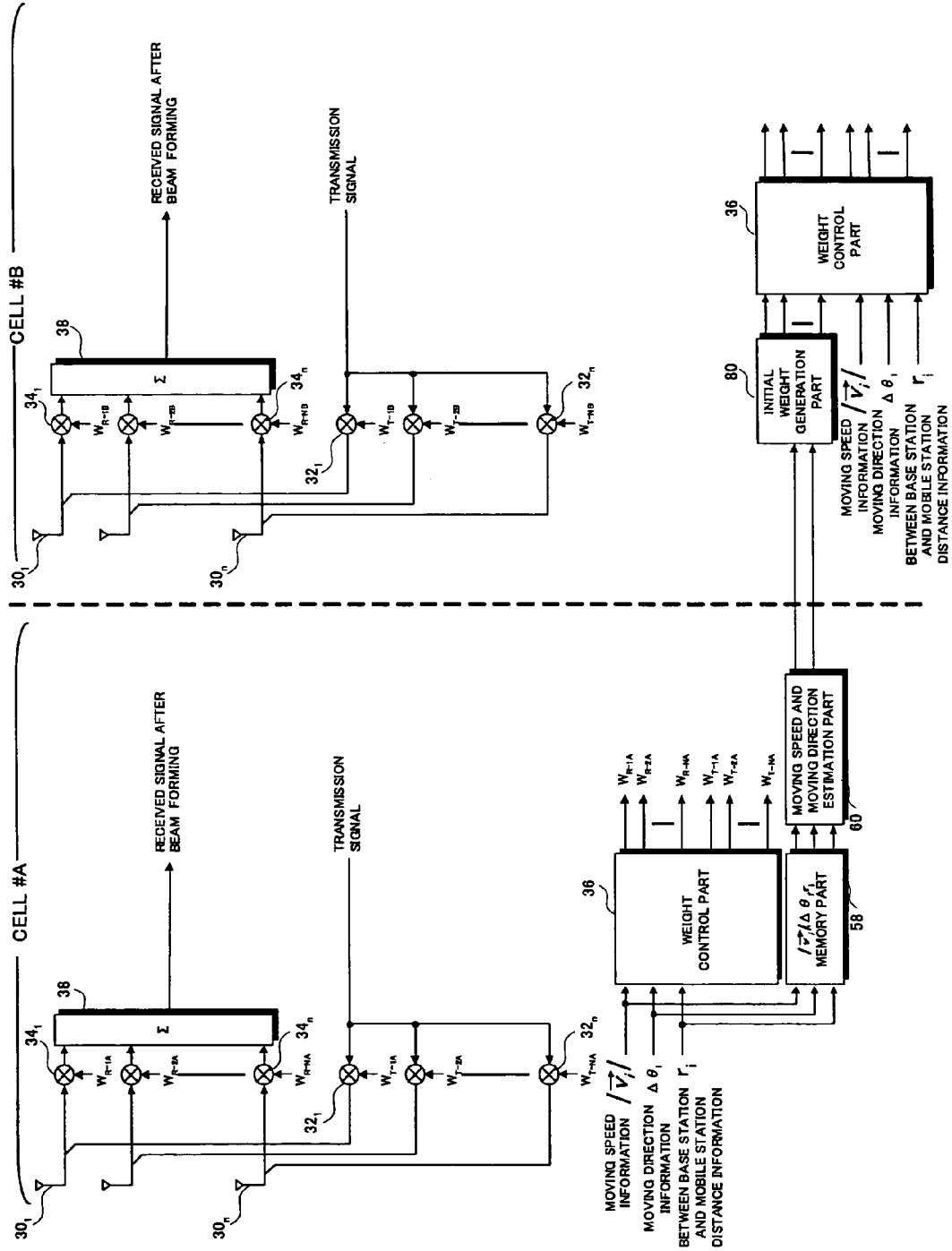
FIG. 21 shows a block diagram of a tenth embodiment of an array antenna apparatus according to the present invention.

FIG. 21 shows a block diagram of a tenth embodiment of an array antenna apparatus according to the present invention. As shown in FIG. 21, in each of adjacent cells #A and #B, N non-directional antennas $30_1$ through $30_n$ are used, a weight vector $W_T$ for transmission beam forming given to multipliers $32_1$ through $32_n$ is expressed by $|w_{T-1}, w_{T-2}, \ldots, w_{T-N}|$, and a weight vector $W_R$ for reception beam forming given to multipliers $34_1$ through $34_1$ is expressed by $|w_{R-1}, w_{R-2}, \ldots, w_{R-N}|$.

In the cell #A, the weight control part 36 operates a convergence algorithm such as that according to a steepest descent method (LMS: Least Mean Squire) or such based on the moving direction information $\Delta\theta_i$ from the moving speed information (the absolute value of a moving speed vector $|\vec{V}_i|$) and the moving direction information $\Delta\theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming receiving beam, which are then supplied to the arrival angle comparing part 56 and the weight determining part 64 together with the moving direction information $\Delta\theta_i$.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the base station and the mobile station.

A plurality of samples of the moving speed information $|\vec{V}_i|$, the moving direction information $\Delta\theta_i$ of the mobile station #i and the distance $r_i$ between the base station and the mobile station supplied to the weight control part 36 are also supplied to and stored in the memory part 58. The moving speed and moving direction estimation part 60 estimates the moving speed $|E\vec{V}_i|$ and the moving direction $\Delta E\theta_i$ thereof from the plurality of samples of the moving speed information $|\vec{V}_i|$ and the moving direction information $\Delta\theta_i$ of the mobile station #i acting as interference as well as the distance $r_i$ between the base station and the mobile station stored in the memory part 58, and provides the estimated values to an initial weight generation part 80 when the relevant mobile station hands over to the cell #B from the cell #A.

In the cell #B, the initial weight generation part 80 estimates a path arrival direction DoA of the mobile station acting as interference from the estimated moving speed $|E\vec{V}_i|$, the estimated moving direction $\Delta E\theta_i$ and the distance $r_i$ (it is obvious that the distance $r_i$ between the base station and the mobile station at the time of handed over=$r_{max}$), carries out reception null forming based on the path arrival direction DoA, generates initial values of a weight vector $W_T$ for forming a transmission beam and a weight vector $W_R$ for forming a reception beam, and provides them to the weight control part 36 in the cell #B.

In this configuration, it becomes possible to instantaneously suppress interference from the mobile station handed over, by reducing an initial pull-in time at a time of beam forming.

Figure 22:
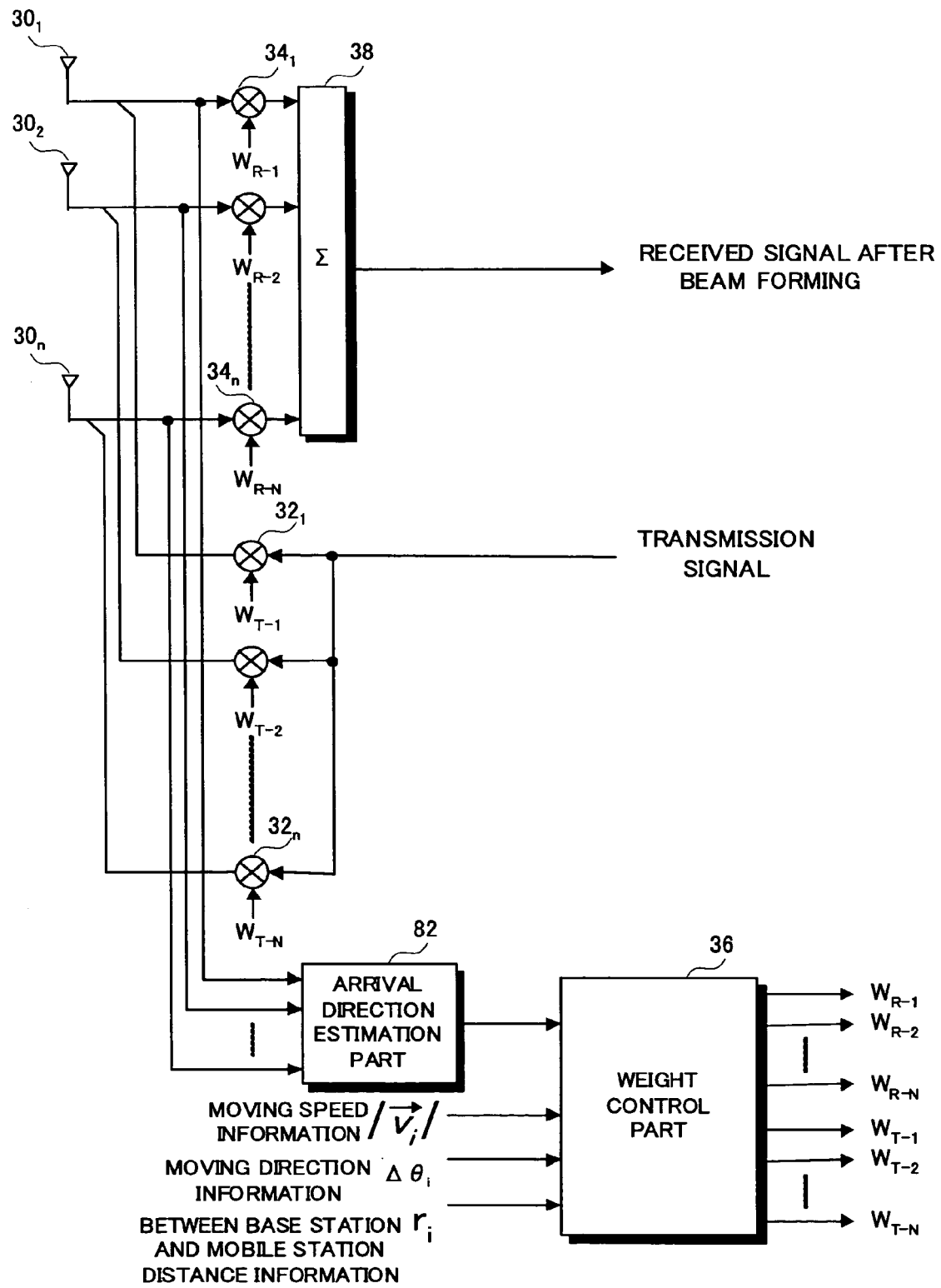
FIG. 22 shows a block diagram of an eleventh embodiment of an array antenna apparatus according to the present invention.

FIG. 22 shows a block diagram of an eleventh embodiment of an array antenna apparatus according to the present invention. As shown in FIG. 22, N non-directional antennas $30_1$ through $30_n$ are used, a weight vector $W_T$ for transmission beam forming given to multipliers $32_1$ through $32_n$ is expressed by $|w_{T-1}, w_{T-2}, \ldots, w_{T-N}|$, and a weight vector $W_R$ for reception beam forming given to multipliers $34_1$ through $34_n$ is expressed by $|w_{R-1}, w_{R-2}, \ldots, w_{R-N}|$.

An arrival angle estimation part 82 estimates a path arrival direction DoA of a mobile station #i acting as interference, and supplies the thus-estimated DoA value to the weight control part 36.

The weight control part 36 operates a convergence algorithm such as that according to a steepest descent method (LMS: Least Mean Squire) or such, with the estimated path arrival direction DoA of the mobile station acting as interference as an initial value, based on the moving direction information $\Delta \theta_i$, from the moving speed information (the absolute value of a moving speed vector $|\vec{V}_i|$) and the moving direction information $\Delta \theta_i$ of the mobile station #i acting as interference, as well as the distance $r_i$ between the base station and the mobile station #i, and carries out reception null forming so as to generate a weight vector $W_T$ for forming transmission beam and a weight vector $W_R$ for forming receiving beam. As a control algorithm carried out by the weight control part 36, that in the first embodiment described above with reference to FIG. 7, or that in the second embodiment described above with reference to FIG. 9 is used.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the base station and the mobile station. Output signals of the multipliers $34_1$ through $34_n$ are added together by an adding part 38, and the addition result is output. The null control rule according to the present invention is applicable as it is also for transmission null forming.

According to the present embodiment, the arrival direction estimation part 82 estimates the path arrival direction DoA of the mobile station acting as interference, and the estimated DoA value is used as an initial value in the weight control part 36. Thereby, convergence of the reception null forming can be achieved within a shorter time.

Figure 23:
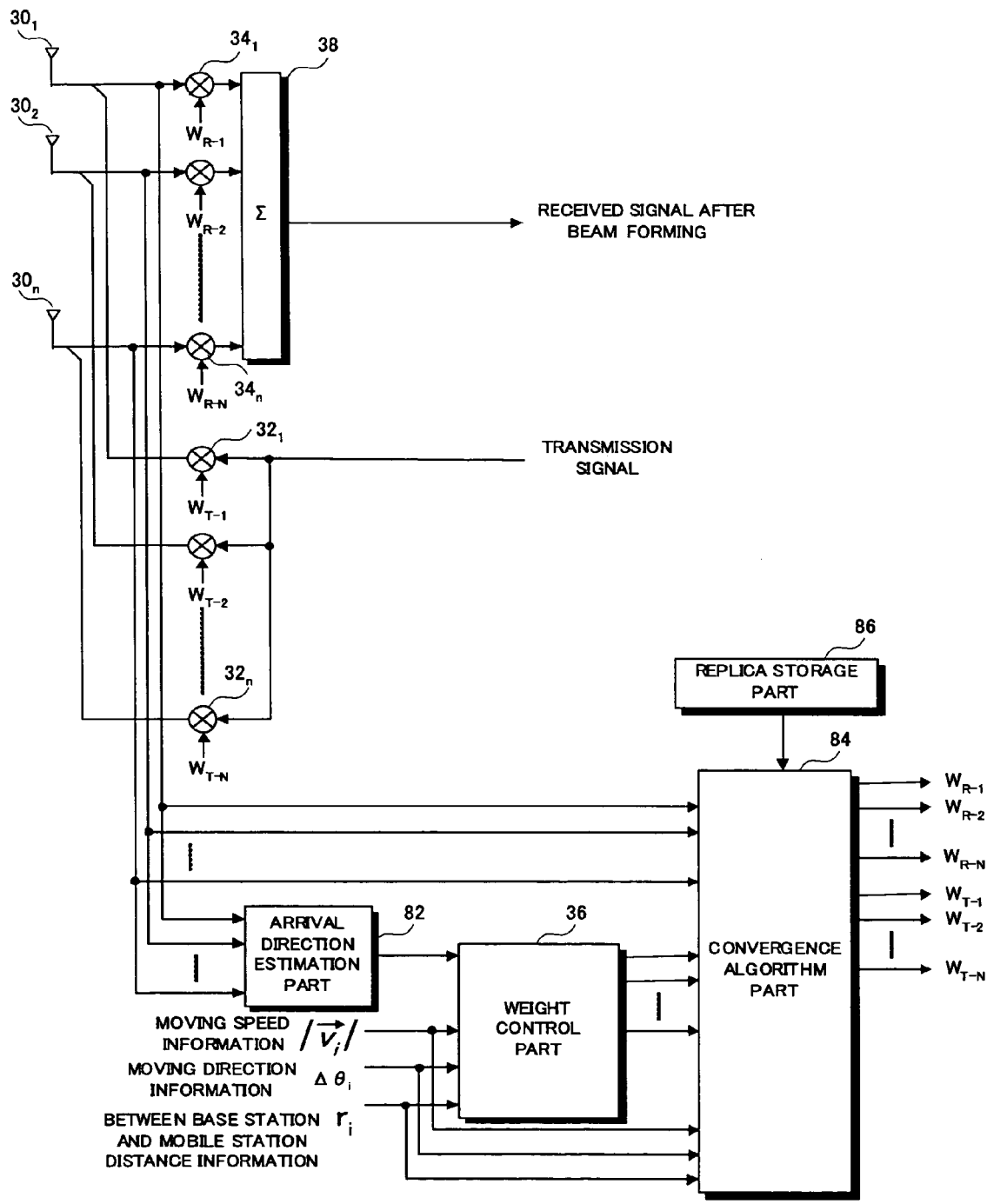
FIG. 23 shows a block diagram of a twelfth embodiment of an array antenna apparatus according to the present invention.

FIG. 23 shows a block diagram of a twelfth embodiment of an array antenna apparatus according to the present invention. As shown in FIG. 23, N non-directional antennas $30_1$ through $30_n$ are used, a weight vector $W_T$ for transmission beam forming given to multipliers $32_1$ through $32_n$ is expressed by $|w_{T-1}, w_{T-2}, \ldots, w_{T-N}|$, and a weight vector $W_R$ for reception beam forming given to multipliers $34_1$ through $34_n$ is expressed by $|w_{R-1}, w_{R-2}, \ldots, w_{R-N}|$.

An arrival angle estimation part 82 estimates a path arrival direction DoA of a mobile station #i acting as interference, and supplies the thus-estimated DoA value to the weight control part 36.

The weight control part 36 operates a convergence algorithm such as that according to a steepest descent method (LMS: Least Mean Squire) or such, with the estimated path arrival direction DoA of the mobile station acting as interference as an initial value, based on the moving direction information $\Delta \theta_i$, from the moving speed information (the absolute value of a moving speed vector $|\vec{V}_i|$) and the moving direction information $\Delta \theta_i$ of the mobile station #i acting as interference, as well as the distance $r_i$ between the base station and the mobile station #i, and carries out reception null forming so as to generate a primary weight vector $W_{1T}$ for forming transmission beam and a primary weight vector $W_{1R}$ for forming receiving beam. As a control algorithm carried out by the weight control part 36, that in the first embodiment described above with reference to FIG. 7, or that in the second embodiment described above with reference to FIG. 9 is used.

For example, each mobile station has a GPS (global positioning system) receiving part, obtains positional information of the own station therefrom, and transmits the positional information to the base station periodically. The base station calculates, from change in the received positional information of each mobile station, the moving speed information, the moving direction information and the distance between the base station and the mobile station. Output signals of the multipliers $34_1$ through $34_n$ are added together by the adding part 38, and the addition result is output. The null control rule according to the present invention is applicable as it is for transmission null forming.

A convergence algorithm part 84 compares a result obtained from multiplying received signals from the antennas $30_1$ through $30_n$ with the primary weight vector $W_{1R}$ supplied from the weight control part 36, with a known reference signal read out from a replica storage part 86, carries out reception null forming by obtaining a convergence according to a convergence algorithm such as that according to a steepest descent method (LMS) or such, and generates a weight vector $W_T$ for forming a transmission beam and a weight vector $W_R$ for forming a reception beam.

According to the present embodiment, since the convergence algorithm is operated twice, it becomes possible to achieve a convergence of the weight vector $W_T$ for forming a transmission beam and the weight vector $W_R$ for forming a reception beam within a shorter time.

In the above-described embodiments, description has been made assuming a downlink transmission from the base station to the mobile stain. However, they are applicable also for uplink transmission from the mobile station to the base station.

The weight control part 36 acts as a weight control part; the received power estimation parts $40_1$, $42_1$ through $42_n$, and the received power combination/average part 44 act as a distance estimation part; the FFT part 46, $52_1$ through $52_n$, frequency combination/average part 54, the maximum frequency detection part 48 and the moving speed estimating part 50 act as a moving speed estimation part; the memory part 58 and the moving speed and moving direction estimation part 60 act as a null point estimation part; the arrival angle comparing part 56 and the weight determining part 84 act as an initial value setting part; the weight correction part 66 acts as a feedback part; the initial weight generation part 80 acts as a handover initial value setting part; the arrival direction estimation part 82 acts as a path arrival direction estimation part; and the convergence algorithm part 84 and the replica storage part 86 act as a converging part.

Further, the present invention is not limited to the above-described embodiments, and variations and modifications may be made without departing from the basic concept of the present invention claimed below.

The present application is based on Japanese priority application No. 2004-056522, filed on Mar. 1, 2004, the entire contents of which are hereby incorporated by reference.

What is claimed is:

1. A method for forming a beam of an array antenna to direct a null point of the array antenna at a mobile station which acts as interference, comprising:
    calculating a signal power to interference power ratio of the mobile station acting as interference and a signal power to interference power ratio of the mobile station acting as interference after a movement of the mobile station acting as interference, based on a moving speed and a moving direction of the mobile station acting as interference as well as a distance between the array antenna and the mobile station acting as interference, in each of respective cases where the distance between the array antenna and the mobile station acting as interference is different; and
    forming a beam to equate the signal power to interference power ratios calculated in the respective cases to one another where the distance between the array antenna and the mobile station acting as interference is different before and after the movement of the mobile station acting as interference.

2. A method for forming a beam of an array antenna to direct a null point of the array antenna at a mobile station which acts as interference, comprising:
    calculating a total sum of signal power to interference power ratios of the mobile station acting as interference obtained through between before and after a movement of the mobile station acting as interference and, based on a moving speed and a moving direction of the mobile station acting as interference as well as a distance between the array antenna and the mobile station acting as interference, in each of respective cases where the distance between the array antenna and the mobile station acting as interference is different; and
    forming a beam to equate the total sums of the signal power to interference power ratios obtained through between before and after the movement of the mobile station acting as interference calculated in the respective cases to one another where the distance between the array antenna and the mobile station acting as interference is different.

3. An array antenna apparatus forming a beam in an array antenna to direct a null point of the array antenna at a mobile station which acts as interference, comprising:
    a weight control part calculating a signal power to interference power ratio of the mobile station acting as interference and a signal power to interference power ratio of the mobile station acting as interference after a movement of the mobile station acting as interference, based on a moving speed and a moving direction of the mobile station acting as interference as well as a distance between the array antenna and the mobile station acting as interference, in each of respective cases where the distance between the array antenna and the mobile station acting as interference is different, and controlling a beam forming weight to equate the signal power to interference power ratios calculated in the respective cases to one another where the distance between the array antenna and the mobile station acting as interference is different before and after the movement of the mobile station acting as interference.

4. An array antenna apparatus forming a beam in an array antenna to direct a null point of the array antenna at a mobile station which acts as interference, comprising:
    a weight control part calculating a total sum of signal power to interference power ratios of the mobile station acting as interference obtained through between before and after a movement of the mobile station acting as interference and, based on a moving speed and a moving direction of the mobile station acting as interference as well as a distance between the array antenna and the mobile station acting as interference, in each of respective cases where the distance between the array antenna and the mobile station acting as interference is different, and controlling a beam forming weight to equate the total sums of the signal power to interference power ratios obtained through between before and after the movement of the mobile station acting as interference calculated in the respective cases to one another where the distance between the array antenna and the mobile station acting as interference is different.

5. The array antenna apparatus claimed in claim 3, further comprising:
    a distance estimation part estimating the distance of the mobile station acting as interference from received power of the mobile station acting as interference from a single antenna of the array antenna.

6. The array antenna apparatus claimed in claim 4, further comprising:
    a distance estimation part estimating the distance of the mobile station acting as interference from received power of the mobile station acting as interference from a single antenna of the array antenna.

7. The array antenna apparatus claimed in claim 3, further comprising:
    a distance estimation part estimating the distance of the mobile station acting as interference from received power of the mobile station acting as interference from an antenna, having maximum received power of the array antenna.

8. The array antenna apparatus claimed in claim 4, further comprising:
    a distance estimation part estimating the distance of the mobile station acting as interference from received power of the mobile station acting as interference from an antenna, having maximum received power of the array antenna.

9. The array antenna apparatus claimed in claim 3, further comprising:
    a distance estimation part estimating the distance of the mobile station acting as interference from an average of received power of the mobile station acting as interference from a plurality of antennas of the array antenna.

10. The array antenna apparatus claimed in claim 4, further comprising:
    a distance estimation part estimating the distance of the mobile station acting as interference from an average of received power of the mobile station acting as interference from a plurality of antennas of the array antenna.

11. The array antenna apparatus claimed in claim 3, further comprising:
    a moving speed estimation part performing Fast Fourier Transform on a received signal from a single antenna of the array antenna, estimating a maximum Doppler frequency and estimating the moving speed of the mobile station acting as interference from the maximum Doppler frequency.

12. The array antenna apparatus claimed in claim 4, further comprising:
a moving speed estimation part performing Fast Fourier Transform on a received signal from a single antenna of the array antenna, estimating a maximum Doppler frequency and estimating the moving speed of the mobile station acting as interference from the maximum Doppler frequency.

13. The array antenna apparatus claimed in claim 3, further comprising:
a moving speed estimation part performing Fast Fourier Transform on a received signal from an antenna, having a maximum received power, of the array antenna, estimating a maximum Doppler frequency and estimating the moving speed of the mobile station acting as interference from the maximum Doppler frequency.

14. The array antenna apparatus claimed in claim 4, further comprising:
a moving speed estimation part performing Fast Fourier Transform of a received signal from an antenna, having a maximum received power, of the array antenna, estimating a maximum Doppler frequency and estimating the moving speed of the mobile station acting as interference from the maximum Doppler frequency.

15. The array antenna apparatus claimed in claim 3, further comprising:
a moving speed estimation part performing Fast Fourier Transform on received signals from a plurality of antennas of the array antenna, estimating a plurality of maximum Doppler frequencies and estimating the moving speed of the mobile station acting as interference from an average of the plurality of maximum Doppler frequencies.

16. The array antenna apparatus claimed in claim 4, further comprising:
a moving speed estimation part performing Fast Fourier Transform on received signals from a plurality of antennas of the array antenna, estimating a plurality of maximum Doppler frequencies and estimating the moving speed of the mobile station acting as interference from an average of the plurality of maximum Doppler frequencies.

17. The array antenna apparatus as claimed in claim 3, comprising:
a null point estimation part estimating, from the moving speed and the moving direction of the mobile station acting as interference obtained before a predetermined observation time point, the null point of the beam at the predetermined observation time point; and
an initial value setting part setting the null point of the beam estimated in said null point estimation part as an initial value for forming the beam, when a difference between the estimated value in said null point estimation part and an actual null point of the beam at the predetermined observation time point exceeds a predetermined threshold value.

18. The array antenna apparatus as claimed in claim 4, comprising:
a null point estimation part estimating, from the moving speed and the moving direction of the mobile station acting as interference obtained before a predetermined observation time point, the null point of the beam at the predetermined observation time point; and
an initial value setting part setting the null point of the beam estimated in said null point estimation part as an initial value for forming the beam, when a difference between the estimated value in said null point estimation part and an actual null point of the beam at the predetermined observation time point exceeds a predetermined threshold value.

19. The array antenna apparatus as claimed in claim 17, comprising:
a feedback part providing in a feedback manner a correction value, according to the difference between the estimated value in the null point estimation part and the actual null point of the beam at the predetermined observation time point, to the weight control part.

20. The array antenna apparatus as claimed in claim 18, comprising:
a feedback part providing in a feedback manner a correction value, according to the difference between the estimated value in the null point estimation part and the actual null point of the beam at the predetermined observation time point, to the weight control part.

21. The array antenna apparatus as claimed in claim 17, wherein:
said initial value setting part sets the initial value when an interference power suppression value obtained from the estimated value in the null point estimation part at the actual null point of the beam at the predetermined observation time point exceeds a predetermined threshold value.

22. The array antenna apparatus as claimed in claim 18, wherein:
said initial value setting part sets the initial value when an interference power suppression value obtained from the estimated value in the null point estimation part at the actual null point of the beam at the predetermined observation time point exceeds a predetermined threshold value.

23. The array antenna apparatus as claimed in claim 3, comprising:
a handover initial value setting part having the moving speed and the moving direction of the handed over mobile station acting as interference supplied thereto, estimating a path arrival direction of said handed over mobile station acting as interference at a time of the handover, and setting the estimated path arrival direction as an initial value in the weight control part.

24. The array antenna apparatus as claimed in claim 4, comprising:
a handover initial value setting part having the moving speed and the moving direction of the handed over mobile station acting as interference supplied thereto, estimating a path arrival direction of said handed over mobile station acting as interference at a time of the handover, and setting the estimated path arrival direction as an initial value in the weight control part.

25. The array antenna apparatus as claimed in claim 3, comprising:
a path arrival direction estimating part estimating a path arrival direction of the mobile station acting as interference from a received signal from the array antenna, and setting the estimated path arrival direction as an initial value in the weight control part.

26. The array antenna apparatus as claimed in claim 4, comprising:
a path arrival direction estimating part estimating a path arrival direction of the mobile station acting as interference from a received signal from the array antenna, and setting the estimated path arrival direction as an initial value in the weight control part.

27. The array antenna apparatus as claimed in claim 3, comprising:

a converging part comparing, with a known reference signal, a result of multiplying a received signal from the array antenna with a reception weight output by the weight control part, causing a convergence and carrying out reception null forming.

28. The array antenna apparatus as claimed in claim 4, comprising:

a converging part comparing, with a known reference signal, a result of multiplying a received signal from the array antenna with a reception weight output by the weight control part, causing a convergence and carrying out reception null forming.

29. The array antenna apparatus as claimed in claim 25, comprising:

a converging part comparing, with a known reference signal, a result of multiplying a received signal from the array antenna with a reception weight output by the weight control part, causing a convergence and carrying out reception null forming.

30. The array antenna apparatus as claimed in claim 26, comprising:

a converging part comparing, with a known reference signal, a result of multiplying a received signal from the array antenna with a reception weight output by the weight control part, causing a convergence and carrying out reception null forming.

* * * * *